US007033180B2

(12) United States Patent
Fujita

(10) Patent No.: US 7,033,180 B2
(45) Date of Patent: Apr. 25, 2006

(54) EDUCATION SET AND WORK MODEL, TRAINING METHOD, WORK EFFICIENCY IMPROVING METHOD, AND TOOL EMPLOYING THE SAME

(76) Inventor: Hideo Fujita, Room 307, TBR Bldg., 10-2, Nagata-cho 2-chome, Chiyoda-Ku Tokyo (JP) 100-0014

( * ) Notice: Subject to any disclaimer, the term of this patent is extended or adjusted under 35 U.S.C. 154(b) by 54 days.

(21) Appl. No.: 10/330,291

(22) Filed: Dec. 30, 2002

(65) Prior Publication Data

US 2003/0134262 A1 Jul. 17, 2003

Related U.S. Application Data

(63) Continuation of application No. PCT/JP01/05665, filed on Jun. 29, 2001.

(30) Foreign Application Priority Data

Jun. 30, 2000 (JP) .............................. 2000-199369

(51) Int. Cl.
*G09B 19/22* (2006.01)

(52) U.S. Cl. ...................... 434/128; 273/243; 273/249; 273/251; 273/252; 273/254; 273/444; 705/8; 705/9; 705/10; 705/11; 434/107; 434/219

(58) Field of Classification Search ................ 434/365, 434/219, 390, 429–431, 427, 369, 236; 273/236, 273/275, 444, 243, 249, 251, 252, 254; 705/11, 705/14; 283/2, 872; 40/122, 107, 335; 368/28

See application file for complete search history.

(56) References Cited

U.S. PATENT DOCUMENTS

| 1,798,647 | A | * | 3/1931 | Anthony | 434/369 |
|---|---|---|---|---|---|
| 4,019,027 | A | * | 4/1977 | Kelley | 235/89 R |
| 4,949,975 | A | * | 8/1990 | Carrier | 273/251 |
| 4,978,305 | A | * | 12/1990 | Kraft | 434/353 |
| 5,090,733 | A | * | 2/1992 | Bussiere | 283/2 |
| 5,350,179 | A | * | 9/1994 | Hill et al. | 273/249 |
| 5,577,915 | A | * | 11/1996 | Feldman | 434/238 |
| 5,607,159 | A | * | 3/1997 | Bryson | 273/243 |
| 5,722,658 | A | * | 3/1998 | Talmage et al. | 273/243 |
| 5,797,204 | A | * | 8/1998 | Paulos | 40/122 |
| 5,810,395 | A | * | 9/1998 | Morgan | 283/70 |
| 5,816,886 | A | * | 10/1998 | Cusolito | 446/444 |
| 5,851,117 | A | * | 12/1998 | Alsheimer et al. | 434/219 |
| 5,931,469 | A | * | 8/1999 | Stichnoth | 273/242 |
| 6,170,750 | B1 | * | 1/2001 | Ueno | 235/462.1 |
| 6,203,327 | B1 | * | 3/2001 | Ottrando | 434/262 |
| 6,676,126 | B1 | * | 1/2004 | Walker et al. | 273/139 |

FOREIGN PATENT DOCUMENTS

| JP | 5-101231 | 4/1993 |
|---|---|---|
| JP | 6-36065 | 5/1994 |

(Continued)

*Primary Examiner*—Monica S. Carter
*Assistant Examiner*—Cameron Saadat
(74) *Attorney, Agent, or Firm*—Oblon, Spivak, McClelland, Maier & Neustadt, P.C.

(57) ABSTRACT

An education set used for education of a work including a series of work steps. The education set includes segment diagrams (105a, 105b, 105c) where work directions for executing the series of work steps, work directions including work guide information from which part of information is excluded, or work guide information are shown and sub-segment diagrams (106a, 106b, 106c) where the information excluded from the segment diagrams are shown. FIG. 6.

14 Claims, 37 Drawing Sheets

FOREIGN PATENT DOCUMENTS

| | | |
|---|---|---|
| JP | 8-7130 | 1/1996 |
| JP | 9-62176 | 3/1997 |
| JP | 10-263132 | 10/1998 |
| JP | 11-327482 | 11/1999 |
| JP | 11-334254 | 12/1999 |
| JP | 2001-124580 | 5/2001 |

* cited by examiner

FIG. 9

| No. | | Money card obtaining time |
|---|---|---|
| 1, 2 | 3, 4 | From 16:42 |
| 5, 6 | 7, 8 | From 16:43 |
| 9, 10 | 11, 12 | From 16:44 |
| 13, 14 | 15, 16 | From 16:45 |

3VIP Money-card obtaining table

Green-I Green-II
Pink-I Pink-II Course

— 111

FIG. 12
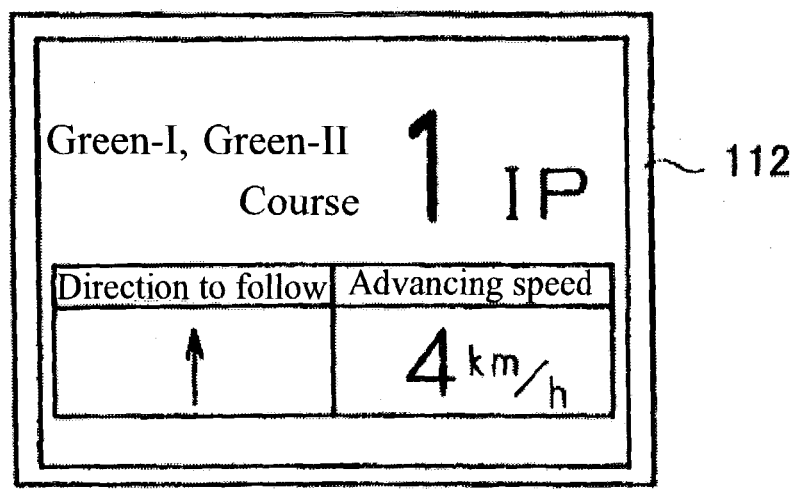
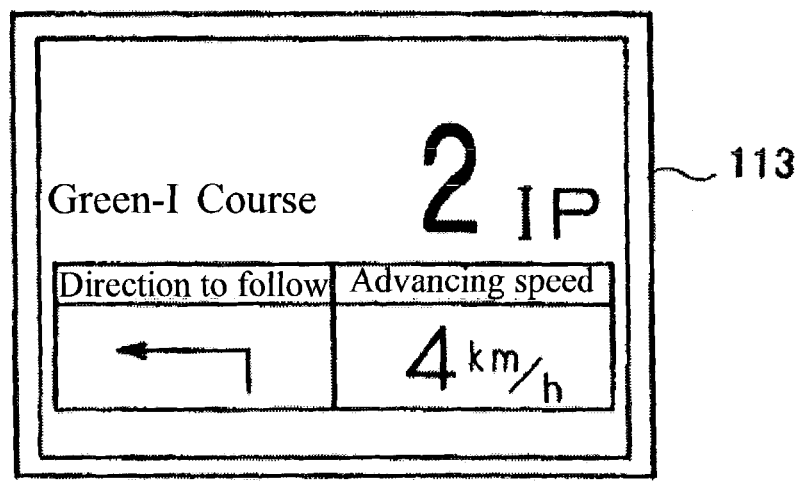
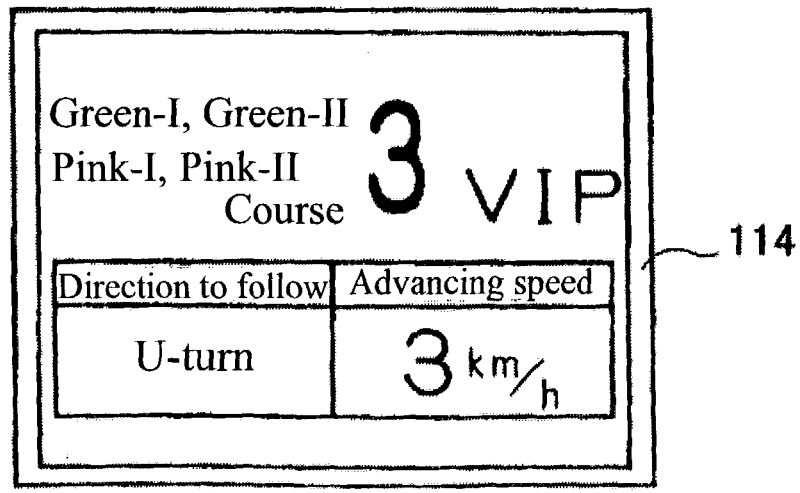

FIG. 14
(a)
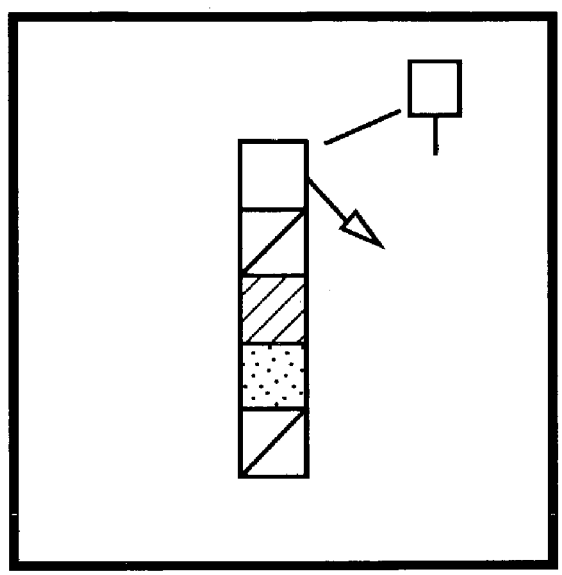
(b)
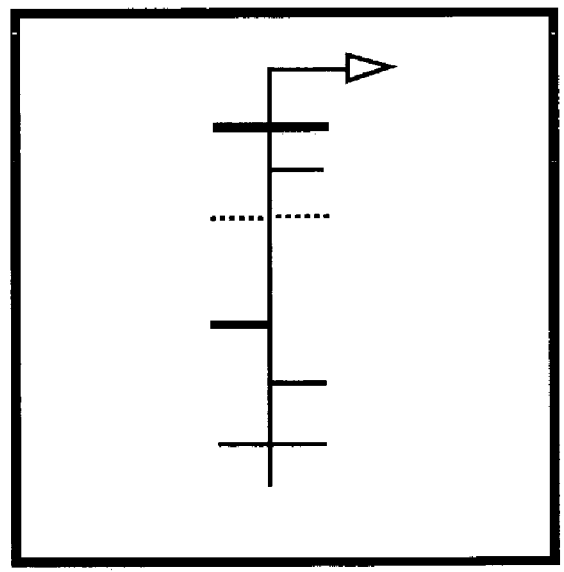

FIG. 16
(a) 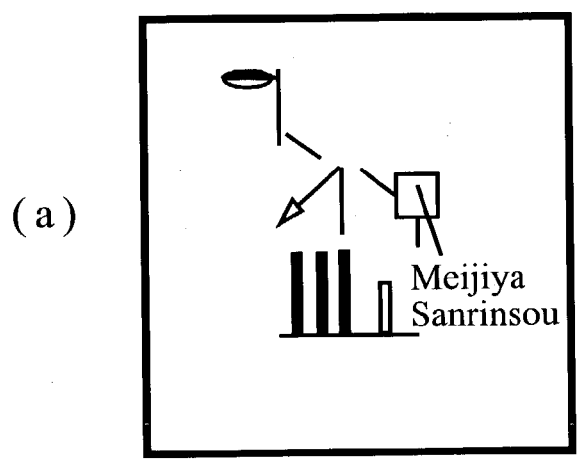
(b) 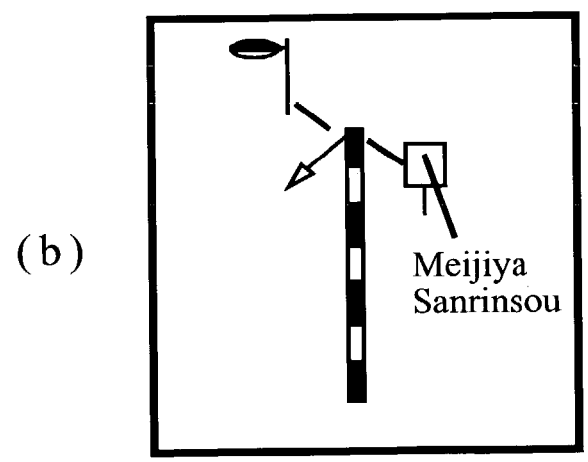
(c) 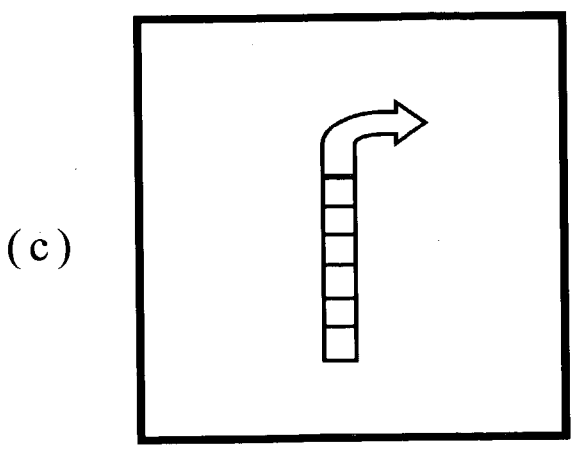

FIG. 17

| | Correct answer ratio of basic mechanism recognition on first impression | | | | | Correct answer ratio of actual intersection recognition | | | | | |
|---|---|---|---|---|---|---|---|---|---|---|---|
| | Average of subject group 1 | Average of subject group 2 | Average of subject group 3 | Average of subject groups 1 to 3 (A1) | Standard deviation of subject groups 1 to 3 (A2) | Average of subject group 1 | Average of subject group 2 | Average of subject group 3 | Average of subject groups 1 to 3 (B1) | Standard deviation of subject groups 1 to 3 (B2) | A1-B1 |
| Fig. 2 | 97.2% | 96.8% | 98.0% | 97.3% | 0.9% | 45.2% | 23.4% | 64.2% | 44.3% | 28.9% | 52.1% |
| Fig. 3 | 60.3% | 70.2% | 68.0% | 66.2% | 7.4% | 10.2% | 4.6% | 12.6% | 9.1% | 5.8% | 56.0% |
| Fig. 4 | 68.2% | 61.4% | 60.0% | 63.2% | 6.2% | 12.4% | 8.8% | 10.4% | 10.5% | 2.6% | 50.8% |
| Fig. 13(a) | 99.6% | 99.0% | 99.2% | 99.3% | 0.4% | 80.2% | 82.4% | 56.8% | 73.1% | 20.1% | 19.1% |
| Fig. 13(b) | 99.8% | 99.0% | 99.8% | 99.5% | 0.7% | 81.3% | 68.8% | 42.4% | 64.2% | 28.1% | 18.2% |
| Fig. 13(c) | 94.2% | 93.2% | 92.2% | 93.2% | 1.4% | 78.2% | 46.2% | 50.2% | 58.2% | 24.7% | 15.0% |
| Fig. 13(d) | 80.3% | 74.8% | 72.3% | 75.8% | 5.8% | 40.6% | 32.8% | 20.4% | 31.3% | 14.4% | 35.2% |
| Fig. 13(e) | 85.2% | 80.4% | 81.6% | 82.4% | 3.5% | 60.4% | 62.4% | 30.8% | 51.2% | 25.0% | 22.0% |
| Fig. 14(a) | 60.4% | 71.2% | 67.2% | 66.3% | 7.7% | 32.8% | 20.8% | 40.8% | 31.5% | 14.2% | 33.5% |
| Fig. 14(b) | 70.2% | 70.8% | 73.2% | 71.4% | 2.2% | 20.8% | 12.8% | 18.0% | 17.2% | 5.7% | 50.6% |
| Fig. 15(a) | 45.6% | 32.2% | 23.4% | 33.7% | 15.8% | 8.6% | 4.2% | 10.2% | 7.7% | 4.4% | 25.1% |
| Fig. 15(b) | 70.2% | 70.6% | 68.6% | 69.8% | 1.5% | 4.8% | 8.8% | 8.8% | 7.5% | 3.3% | 65.0% |
| Fig. 15(c) | 40.2% | 50.2% | 35.2% | 41.9% | 10.8% | 10.4% | 12.8% | 10.8% | 11.3% | 1.8% | 31.5% |
| Fig. 15(d) | 50.3% | 43.6% | 41.3% | 45.1% | 6.6% | 21.3% | 24.8% | 22.4% | 22.8% | 2.5% | 23.8% |
| Fig. 15(e) | 41.4% | 37.2% | 46.3% | 41.6% | 6.4% | 18.8% | 24.8% | 26.0% | 23.2% | 5.5% | 22.8% |
| Fig. 15(f) | 60.8% | 57.6% | 59.3% | 59.2% | 2.3% | 23.2% | 26.8% | 20.4% | 23.5% | 4.5% | 36.0% |
| Fig. 16(a) | 30.8% | 36.8% | 31.2% | 32.9% | 4.7% | 8.0% | 10.4% | 4.6% | 7.7% | 4.1% | 24.9% |
| Fig. 16(b) | 49.8% | 68.2% | 56.2% | 58.1% | 13.2% | 24.2% | 20.8% | 24.8% | 23.3% | 3.1% | 33.9% |
| Fig. 16(c) | 20.4% | 32.4% | 15.7% | 22.8% | 12.2% | 6.4% | 8.8% | 14.6% | 9.9% | 6.0% | 16.4% |
| Fig. 21 | 97.4% | 96.8% | 98.0% | 97.4% | 0.8% | 68.2% | 70.4% | 40.4% | 59.7% | 23.6% | 29.2% |
| Fig. 22 | 68.2% | 70.2% | 67.2% | 68.5% | 2.2% | 32.2% | 30.4% | 18.4% | 27.0% | 10.6% | 36.3% |
| Fig. 23 | 50.6% | 51.2% | 56.2% | 52.7% | 4.3% | 24.6% | 20.6% | 16.0% | 20.4% | 6.1% | 28.1% |
| Comparative example 1 | 100.0% | 100.0% | 100.0% | 100.0% | 0.0% | 97.0% | 96.0% | 98.2% | 97.1% | 1.6% | 3.0% |
| Comparative example 2 | 88.2% | 86.4% | 82.4% | 85.7% | 4.2% | 80.4% | 82.4% | 81.6% | 81.5% | 1.4% | 5.3% |
| Comparative example 3 | 99.0% | 99.0% | 99.0% | 99.0% | 0.0% | 96.2% | 98.4% | 97.8% | 97.5% | 1.6% | 2.8% |

FIG. 25
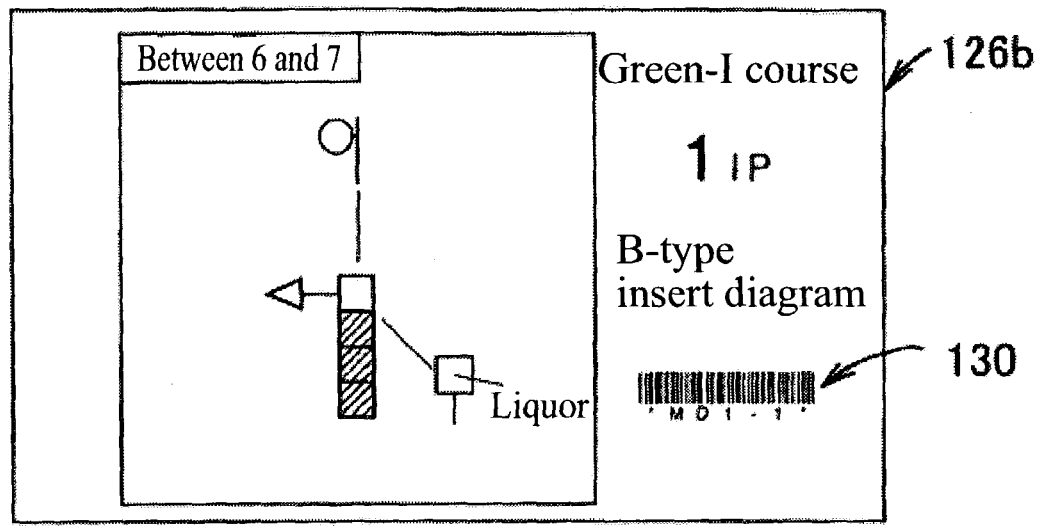
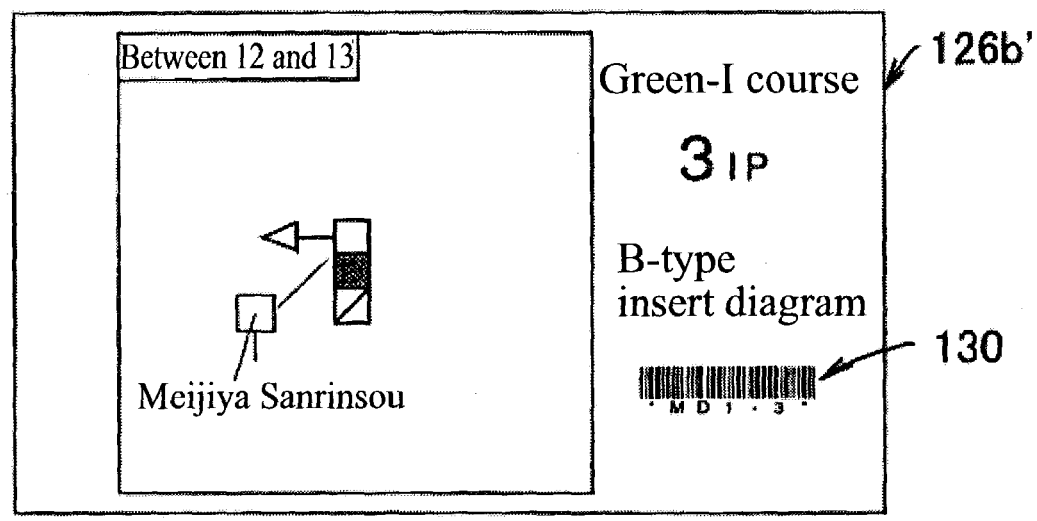
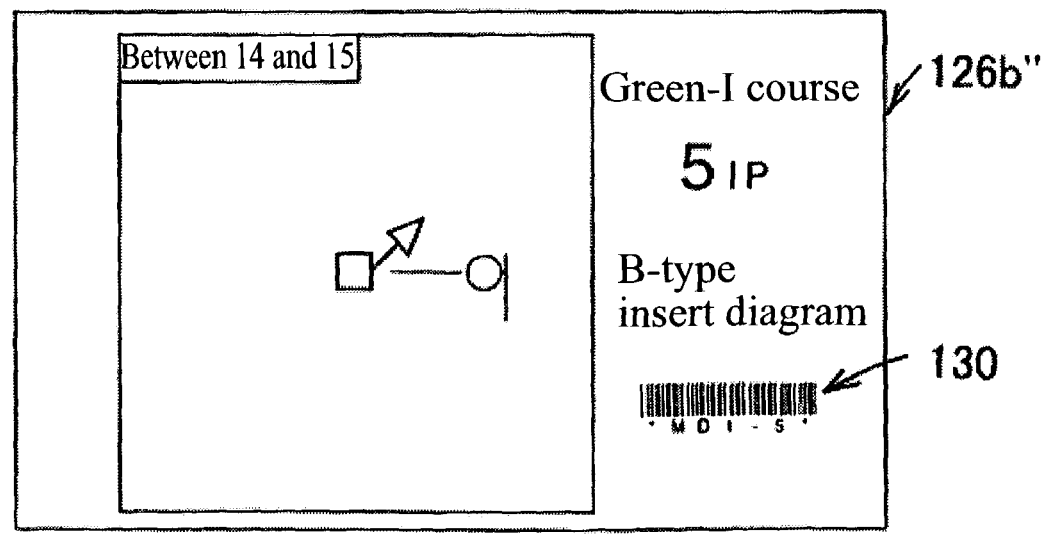

FIG. 28

| | | | | Money card obtainable time |
|---|---|---|---|---|
| Green-I Green-II Green-III Pink-I Pink-II Pink-III Course | | 2 VIP | Money-card obtaining table | |
| | No. | | | |
| ▮▮ | 1, 2 | 3, 4 | ▮▮ | From 16:20 |
| ▮▮ | 5, 6, 60 | 7, 8, 70 | ▮▮ | From 16:21 |
| ▮▮ | 9, 10, 90 | 11, 12, 80 | ▮▮ | From 16:22 |
| ▮▮ | 13, 14 | 15, 16 | ▮▮ | From 16:23 |
| ▮▮ | 17, 18 | 19, 20 | ▮▮ | From 16:24 |
| ▮▮ | 21, 22 | 23, 24 | ▮▮ | From 16:25 |
| ▮▮ | 25, 26 | 27, 28 | ▮▮ | From 16:26 |
| ▮▮ | 29, 30 | 31, 32 | ▮▮ | From 16:27 |
| ▮▮ | 33, 34 | 35, 36 | ▮▮ | From 16:28 |
| ▮▮ | 37, 38 | 39, 40 | ▮▮ | From 16:29 |
| ▮▮ | 41, 42 | 43, 44 | ▮▮ | From 16:30 |
| ▮▮ | 45, 46 | 47, 48 | ▮▮ | From 16:31 |
| ▮▮ | 49, 50 | 51, 52 | ▮▮ | From 16:32 |

Segment-diagram purchase table — 131
503
505

| No. | | Segment diagram to purchase (Encircle) | | |
|---|---|---|---|---|
| 5 | ▊▊▊ | A ▊▊▊ | B ▊▊▊ | C ▊▊▊ |
| 6 | ▊▊▊ | A ▊▊▊ | B ▊▊▊ | C ▊▊▊ |
| 60 | ▊▊▊ | A ▊▊▊ | B ▊▊▊ | C ▊▊▊ |
| 13 | ▊▊▊ | A ▊▊▊ | B ▊▊▊ | C ▊▊▊ |
| 14 | ▊▊▊ | A ▊▊▊ | B ▊▊▊ | C ▊▊▊ |
| 25 | ▊▊▊ | A ▊▊▊ | B ▊▊▊ | C ▊▊▊ |
| 26 | ▊▊▊ | A ▊▊▊ | B ▊▊▊ | C ▊▊▊ |
| 41 | ▊▊▊ | A ▊▊▊ | B ▊▊▊ | C ▊▊▊ |
| 42 | ▊▊▊ | A ▊▊▊ | B ▊▊▊ | C ▊▊▊ |

Team name

A-type···$4,000
B-type···$6,000
C-type···$2,000

Total $

FIG. 37
Product A
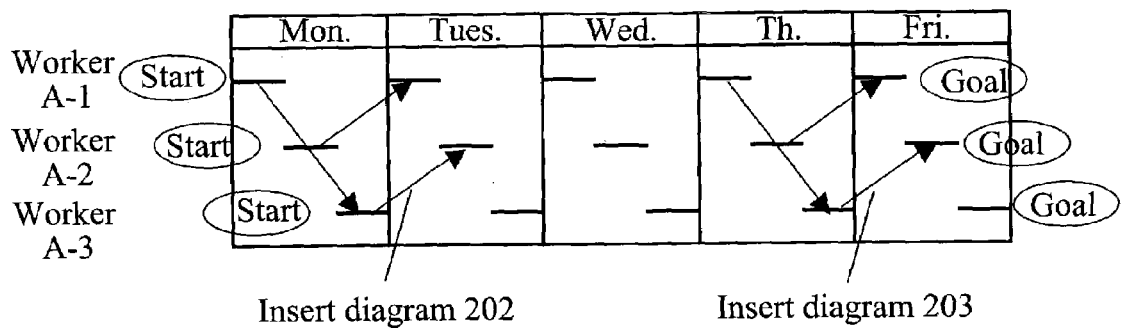
Product B
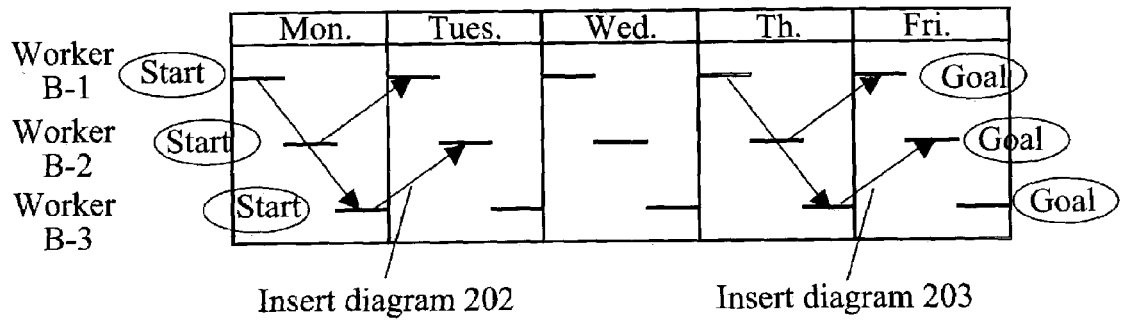
Product C
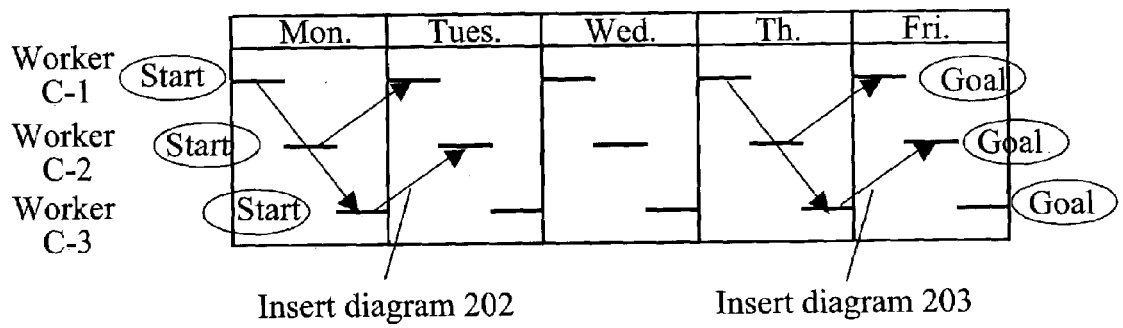
Product D
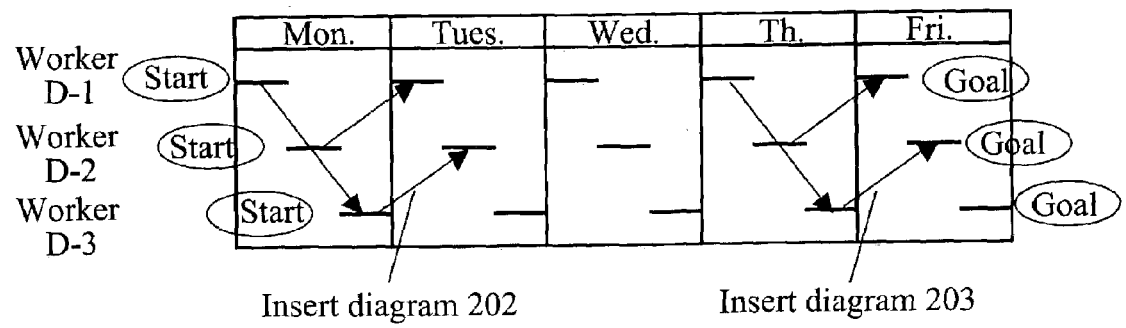

EDUCATION SET AND WORK MODEL, TRAINING METHOD, WORK EFFICIENCY IMPROVING METHOD, AND TOOL EMPLOYING THE SAME

CROSS REFERENCE TO RELATED APPLICATION

This is a Continuation Application of PCT Application No. PCT/JP01/05665, filed on Jun. 29, 2001, which was not published under PCT Article 21(2) in English. This application is based upon and claims the benefit of priority from the prior Japanese Patent Application No. 2000-199369, filed on Jun. 30, 2000, the entire contents of which are incorporated herein by reference.

TECHNICAL FIELD

The present invention relates to an education set and a work model, a training method, a work efficiency improving method, and a tool employing the same.

BACKGROUND TECHNOLOGY

Activities (work) in organizations such as corporations are becoming increasingly competitive, and accordingly it is important to improve the abilities of individuals belonging to organizations and the competence of the organizations. To realize this goal, individuals are required not only to accumulate ostensible technical knowledge but also to positively tackle problems pertaining to the organization, properly exchange information both within and outside of the organization, challenge others with their knowledge, and create knowledge in a broad sense.

On the contrary, many individuals belonging to an organization are in an "instruction waiting" state to achieve only those things they are instructed to do, or in an inactive state of wasting accessible information that is important for achieving an objective of the organization. These states are frequently obstacles to attaining an objective of the organization or corporation. For example, there may be a member of an organization who faithfully achieves only those assignments instructed by a supervisor in the organization. Even if the situation changes and the member foresees a problem occurring when directly carrying out only the instructed assignments, the member accomplishes the instructed assignments without change, thereby inflicting further problems on the organization and other members of the organization.

To cope with such circumstances and develop the abilities of individuals and organizations, many training activities in a variety of methods are carried out in organizations and dedicated training institutions.

For example, frequently used learn-through-experience methods include role-playing in a workplace scenario which gives each participant a specific role and lets the participants act out a problem, a business game that models the activities of a corporation with competitive conditions and makes participants manage the model corporation, a case study that analyzes successful or unsuccessful corporation examples, or wars, a training game that employs a game to set up a specific simulated situation at a training site and makes participants experience the situation, and orienteering in which participants trace points set in a rural area and on a map according to specific rules.

Other frequently used methods include a walk rally carried out by pairs of contestants that walk according to course information written with specific rules and a set walking speed and compete for the correctness of routing and speed, and an F1 in which a pair of people prepare (P-process) travel information about a predetermined course and another pair in the same team travels (D-process) along the course with the use of the information, to reach checkpoints and the goal faster than competing pairs, thereby accomplishing a task.

PROBLEMS TO BE SOLVED BY THE INVENTION

The role-playing method may be effective for individuals to gain a certain understanding and sympathy through actions. However, it involves a problem of hardly improving organizational ability. The business game method may be useful for understanding the importance of decision making and a sense of cooperation in organizations but it involves problems of high development cost in practical application and imposing heavy burdens on teachers. It also involves difficulty in properly evaluating results. The case study method only analyzes past examples in which results are already known, and such examples are virtual reality for participants who may not sense the tense feeling of the problem from desk studies.

Also, the training game method may easily attract the interest of participants and draw active interest therein but it has problems of simply providing entertainment and not providing results. The orienteering and walk rally methods may improve analytic and judgmental abilities but it has a problem of providing only an easy sense of play. The walk rally and F1 methods require participants to work in pairs when performing the tasks, and therefore, one may take a leadership role and the other may simply follow, which will hardly improve individual abilities. The participants only compete for final time and barely recognize competitive relationships with others during the play, causing a problem of rarely bringing out individual abilities. The orienteering method is based on simple rules of reading maps and advancing, and accordingly needs no demonstration of deep insight.

Under these circumstances, the present inventor has studied actual work habits and procedures in organizations such as corporations, compared actual workplace situations with the above-mentioned learn-through-experience methods, and extracted the characteristics of the actual workplace. Namely, in the actual workplace, the actions and attitudes (for example, the degree of endeavor) of individuals directly influence not only individual results but also organizational results. It is necessary for each individual to accomplish his or her work by himself or herself. If one abandons his or her task midway, it will worsen individual and organizational results. If the actions of a member of an organization are improper, it badly affects the results of other members of the organization. In other words, even if an individual in an organization improves their ability to properly cope with work, an improper action by another in the organization can deteriorate individual and organizational results.

In addition, the actions and attitudes of an organization and its members are greatly affected by the presence of a leader and the method of leadership. This is different from desk studies. Individuals must wholly carry risks and advance through tense realities. These characteristics have been extracted by the present inventor.

However, the above-mentioned conventional methods have the problems previously explained, and therefore, are unable to make participants experience such essential work characteristics.

An object of the present invention is to provide an education set and a work model, a training method, and a work efficiency improving method employing the same, capable of allowing participants to efficiently experience the essence of work in a short period at low cost and greatly improving the intellectual creativity, knowledge, and abilities of individuals and organizations.

SUMMARY OF INVENTION

An education set according to the present invention is used to educate people in organizations about their work which includes a series of work stages. The education set includes segment diagrams (105a, b, c) showing work guides or work information partly excluding work guides or work information needed to carry out the series of work stages and insert diagrams (106a, b, c) showing the information excluded from the segment diagrams.

In the education set, the work to be performed preferably includes having a worker advance along a predetermined walking course, and the work stages preferably include having a worker choose a proper route at an intersection of a plurality of routes in the walking course.

In the education set, it is preferable that the segment diagrams and insert diagrams show, in connection with "an intersection where one must advance in a direction other than the direction in which the road goes," at least one of the number of intersecting roads, the angles of the intersecting roads, center lines of the intersecting roads, widths of the intersecting roads, and signboards, utility poles, lighting poles, etc., (hereinafter called landmarks and the like) in the vicinity of the intersecting roads.

Alternatively, it is preferable that the diagrams show at least one of a distance between "intersections where one must advance in a direction other than the direction in which the road goes," a choice rule for choosing a road to follow at an intersection between the "intersections where one must advance in a direction other than the direction in which the road goes," and landmarks and the like existing between the "intersections where one must advance in a direction other than the direction in which the road goes."

In the education set, it is preferable that a plurality of types of the segment and insert diagrams are prepared for a course to be followed.

In the education set, it is preferable that the segment diagrams include segment diagram elements (501) showing work guides for the work stages.

In the education set, it is preferable that the insert diagrams have bar codes storing work-type information such as information on a course to be followed and work stage numbers such as checkpoint information.

In the education set, it is preferable that backs of the insert diagrams have adhesive means such as paste.

It is preferable that the education set further includes a work progress recording sheet (107) for recording progress in the series of work stages, having an area (109) to attach insert diagrams, an area (108) to record worker information, and an area (110) to record work completion time of each stage.

It is preferable that the education set further includes a work progress recording sheet (107) for recording progress in the series of work stages, having an area (109) to attach insert diagrams and an area (108) to record worker information. The work progress recording sheet (107) is preferably provided with a bar code to store worker information.

It is preferable that the education set further includes point cards (115) to be given to a worker when the worker completes work under given conditions.

In the education set, it is preferable that the point cards have bar codes to store point information.

It is preferable that the education set further includes a sheet (111) to show standard work completion time of each work stage, the standard work completion time being set for each worker.

It is preferable that the education set further includes a segment-diagram purchase sheet (131) having bar codes (503) to store worker information and bar codes (505) to store information on segment diagrams to be picked up by workers.

In the education set, it is preferable that the information excluded from the segment diagrams includes work guides or work information on part of the series of work stages.

It is preferable that the education set further includes blank segment diagrams and blank insert diagrams having blanks to be completed by workers with additional work guides or work information for carrying out the series of work stages.

It is preferable that the education set further includes signboards installed at work points (IPs, VIPs) and having supplemental information (for example, a course name, a point number, a direction to follow, and an advancing speed) necessary to follow the course.

Another aspect of the present invention provides an education system used with the education set for providing an education about work which includes a series of work stages.

The system includes a score computing means for computing a score of a worker according to information from point cards (115) to be given to the worker when the worker completes work under given conditions, a cost computing means for computing a cost related to the worker according to work time of the worker and information from a segment-diagram purchase sheet (131) to record information about a segment diagram picked up by the worker, and a result computing means for computing the results of the worker according to the score and cost of the worker.

It is preferable that the system further includes an information reading means such as a bar-code reader for reading point information from an information recording means such as a bar code provided on the point card (115), segment-diagram cost information from an information recording means such as a bar code provided on the segment-diagram purchase sheet (131), and worker information from an information recording means such as a bar code provided on the work progress recording sheet (107) at the start and completion of work to calculate work time of a worker.

It is preferable that the system further includes an information reading means such as a bar-code reader arranged at each work execution location, for reading an information recording means (130d) such as a bar code on the work progress recording sheet (107) to record worker information and an information recording means (130) such as a bar code to record insert-diagram information.

Still another aspect of the present invention provides a work model with which a plurality of teams consisting of a plurality of members compete with each other for team results. Whenever a member obtains materials, parts, information, etc., necessary for the member to accomplish work, a predetermined amount of money is recorded as expenses. A predetermined amount of money is recorded as earnings for a work result of each member. From the difference between the expenses and the earnings, an individual result for each member is computed, and according to the individual results, a team result is computed. A mechanism is provided such that at least part of a result of accomplished work of a predetermined member in a team is used by another predetermined member in the same team to accomplish work. The way a member in a team conducts work affects individual and team results of the same team. The work model preferably provides an opportunity for each member to carry out at least part of the work individually.

It is preferable for the work model that members of each team form pairs, a competitive relationship is set between two pairs from different teams, each member is assigned an individual course, the two pairs simultaneously start with each member taking a given course, and each member must pass at least one each of first and second-type points set on the course and reach a goal. Before starting, each member is allowed to purchase, with a predetermined amount of money, partly-omitted course information necessary for tracing the course. At the first-type point, each member of a pair may obtain supplemental information for the omitted part of the course information for the other member of the pair. There is a chance in the middle of the course that the supplemental information obtained by the members of the pair can be exchanged with each other. At the second-type point and the goal, one of the competing pairs that reaches the point or the goal faster than the other pair can obtain money cards. An amount of money paid for the course information is recorded as expenses, and an amount of the obtained money cards is divided between the members of the pair and is recorded as earnings of each member when computing an individual result of each member.

It is preferable for the work model that the obtaining of money cards at the second-type point is carried out after a preset time for obtaining the money card.

It is preferable for the work model that, for each member, the start time at the start and the arrival time at at least two of the first and second-type points and goal are recorded, a course advancing speed is specified for at least one interval between the start, first and second-type points, and goal, set arrival time at each of the first and second-type points and goal is computed according to the distance of an interval derived from the course information and supplemental information and the specified advancing speed of the interval, and a time cost is computed from the difference between the recorded arrival time and the set arrival time and is used to establish expenses of the member.

It is preferable for the work model that a predetermined member of a team prepares information about at least part of the work for a second member of the same team, and the second member solely accomplishes the work according to the information.

Another aspect of the present invention is a work efficiency improving method employing the work model as a work promoting format.

Still another aspect of the present invention is a training method employing the work model.

Still another aspect of the present invention is a tool used for the work model, including at least one of course information insufficiently showing information necessary for a participant to advance along a course, supplemental information showing information for supplementing the insufficient part of the course information, money cards, a first-arrived-pair display means for displaying a pair of member who first arrive at a second-type point, a start time recording means, and an arrival time recording means for recording arrival time at first-type points and second-type points and the goal, and an advancing speed specifying means.

BRIEF DESCRIPTION OF DRAWINGS

FIG. 9 is an explanatory view showing a money-card obtaining table according to an embodiment of the present invention;

FIG. 12 is an explanatory view showing IP signboards according to an embodiment of the present invention;

FIG. 14 is an explanatory view showing segment diagram elements according to an embodiment of the present invention;

FIG. 16 is an explanatory view showing segment diagram elements according to an embodiment of the present invention;

FIG. 17 is an explanatory view showing intersection recognition correctness ratios of various segment diagram elements of the embodiment and of comparative examples;

FIG. 25 is an explanatory view showing insert diagrams with bar codes according to an embodiment of the education set of the present invention;

FIG. 28 is an explanatory view showing a money-card obtaining table with bar codes according to an embodiment of the education set of the present invention;

FIG. 30 is an explanatory view showing a segment-diagram purchase table with bar codes according to an embodiment of the education set of the present invention;

FIG. 37 is an explanatory view showing a work efficiency improving method employing the education set of the embodiment;

BEST MODE OF IMPLEMENTATION

Figure 1:
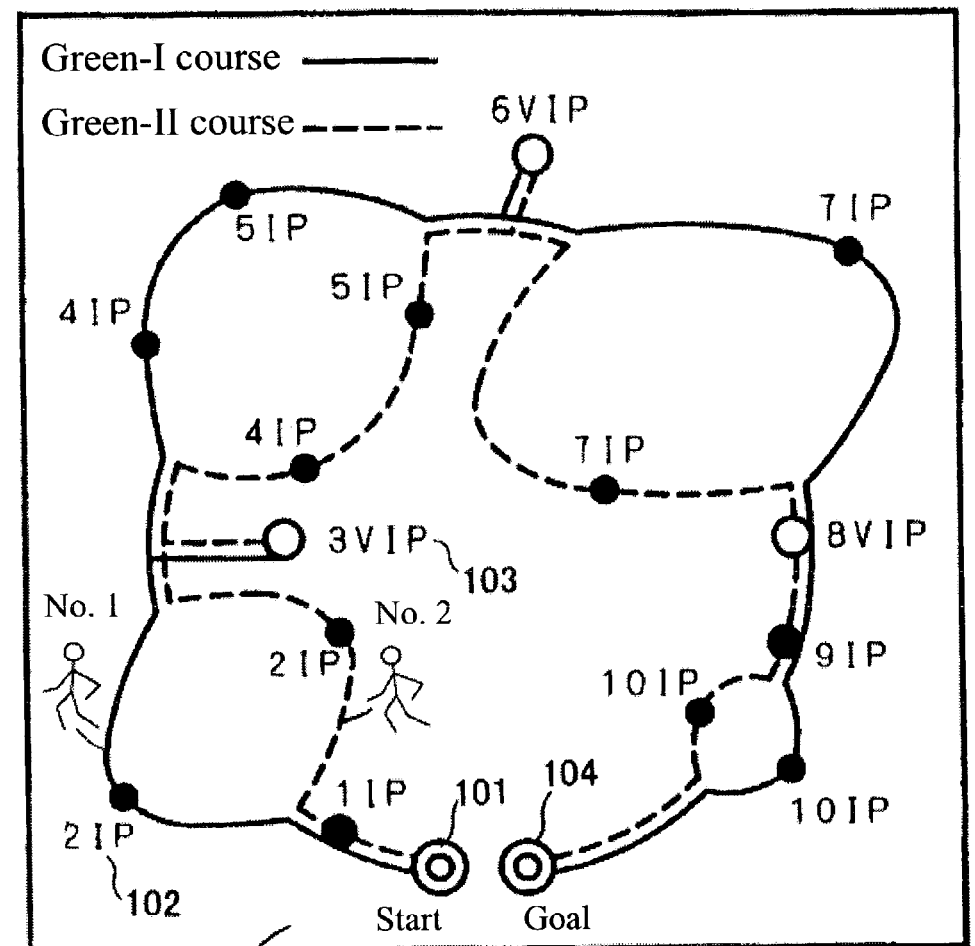
FIG. 1 is an explanatory view showing a course according to an embodiment of an education set of the present invention.

With reference to the drawings, an embodiment of the education set of the present invention will be explained. Through out the drawings, the same or like elements are provided with the same or like reference numerals.

The education set is used to educate people in organizations about their work which includes a series of work stages. The education set includes segment diagrams (105a, b, c) showing work guides or work information partly excluding or omitting work guides or work information needed to carry out the series of work stages and insert diagrams (106a, b, c) showing the information excluded or omitted from the segment diagrams. The type of work includes having a worker advance along a predetermined walking course, and the work stages include having a worker choose a proper road at an intersection of a plurality of roads in the walking course.

In the following, an education method or a work model employing the education set will be explained, and at the same time, the education set will be explained.

More precisely, the work model explained below assumes a case involving 32 participants (workers) divided into four teams (A1, A2, B1, and B2) each comprising 8 members with A1 and A2 forming a block A and B1 and B2 forming a block B, the blocks competing with each other for accomplishing certain results.

According to the work model performed with the use of the education set of the embodiment, the teams compete with each other such that competing members of the teams simultaneously start in successive order, advance along predetermined walking courses set by an organizer, compete with each other for quickly and/or correctly reaching specific points set along the courses and the goal, and obtain point cards (more precisely, money cards) as an award. In addition, the members compete regarding the correctness of their advancing speed. At this time, each team forms four pairs each comprising two members, and the members of each pair accomplish respective tasks, exchange results obtained during task execution with each other, and use the exchanged results to accomplish the tasks.

The walking courses are, for example, four courses (green-I course, green-II course, pink-I course, and pink-II course) that are arranged outdoors and partly overlap. Two pairs from different teams simultaneously start with the members of one pair taking the green-I and green-II courses, respectively, and the members of the other pair taking the pink-I and pink-II courses, respectively. Thereafter, at different start times, pairs (competing pairs) start two by two. Combinations of two pairs that simultaneously start and courses assigned for the pairs are preset by the organizer.

FIG. 1 diagrammatically shows the green-I and green-II courses among the four courses. The pink-I and pink-II courses, which are not shown, are formed in a manner similar to the green-I and green-II courses.

As is apparent in the figure, each course includes points to be passed such as a start 101, first-type points (referred to as IPs) IP102 (2IP, 4IP, 5IP, 7IP, 9IP, and 10IP in FIG. 1), second-type points (referred to as VIPs) VIP103 (3VIP, 6VIP, and 8VIP in FIG. 1), and a goal or finish point 104 (the IPs and VIPs being numbered from the start to the goal). The IPs include IPs arranged at different locations depending on courses and IPs arranged at identical locations. Each course has the same number of IPs. The start, VIPs, and goal are arranged at common locations on the courses.

Participants (workers) are provided with no maps for advancing along the courses. Instead, they are provided with segment diagrams (special course information) according to the present embodiment. The segment diagram shows a series of stages to be supplemented by insert diagrams (explained later) corresponding to the segment diagram. The segment diagram shows work guides or work contents for a plurality of stages. For example, three kinds of segment diagram are prepared for each course.

Figure 2:
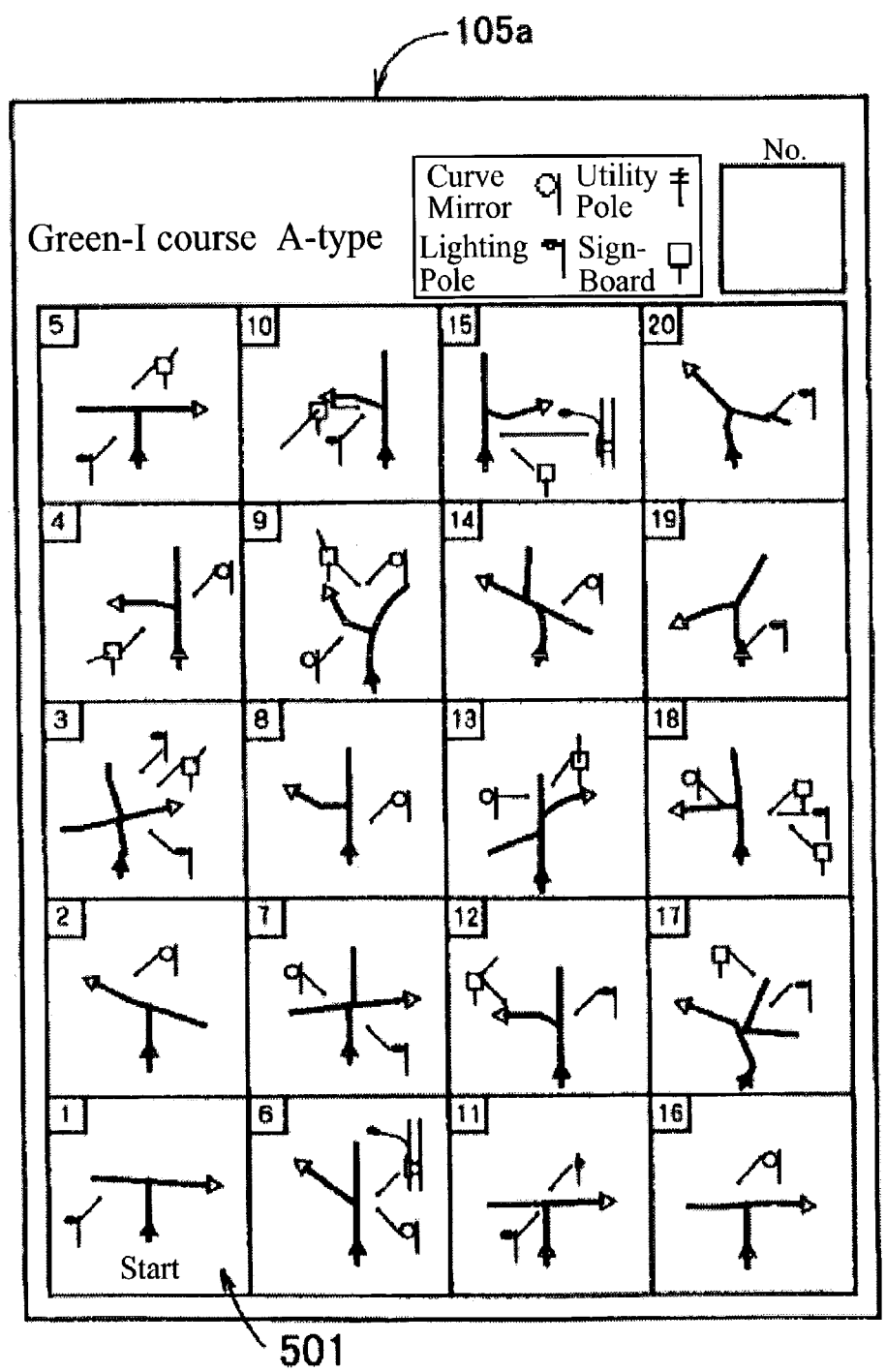
FIG. 2 is an explanatory view showing a segment diagram according to an embodiment of the present invention.
Figure 3:
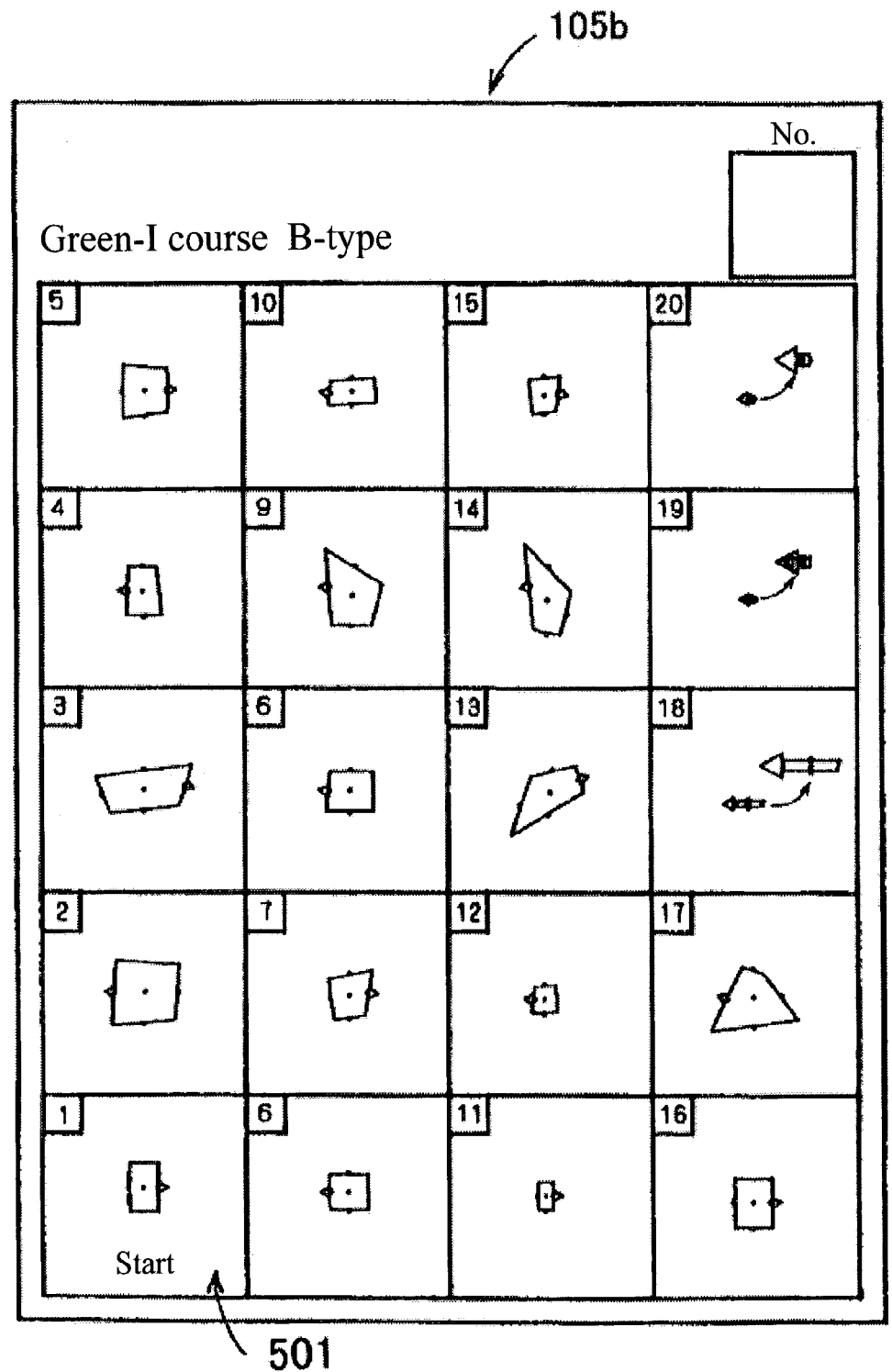
FIG. 3 is an explanatory view showing a segment diagram according to an embodiment of the present invention.
Figure 4:
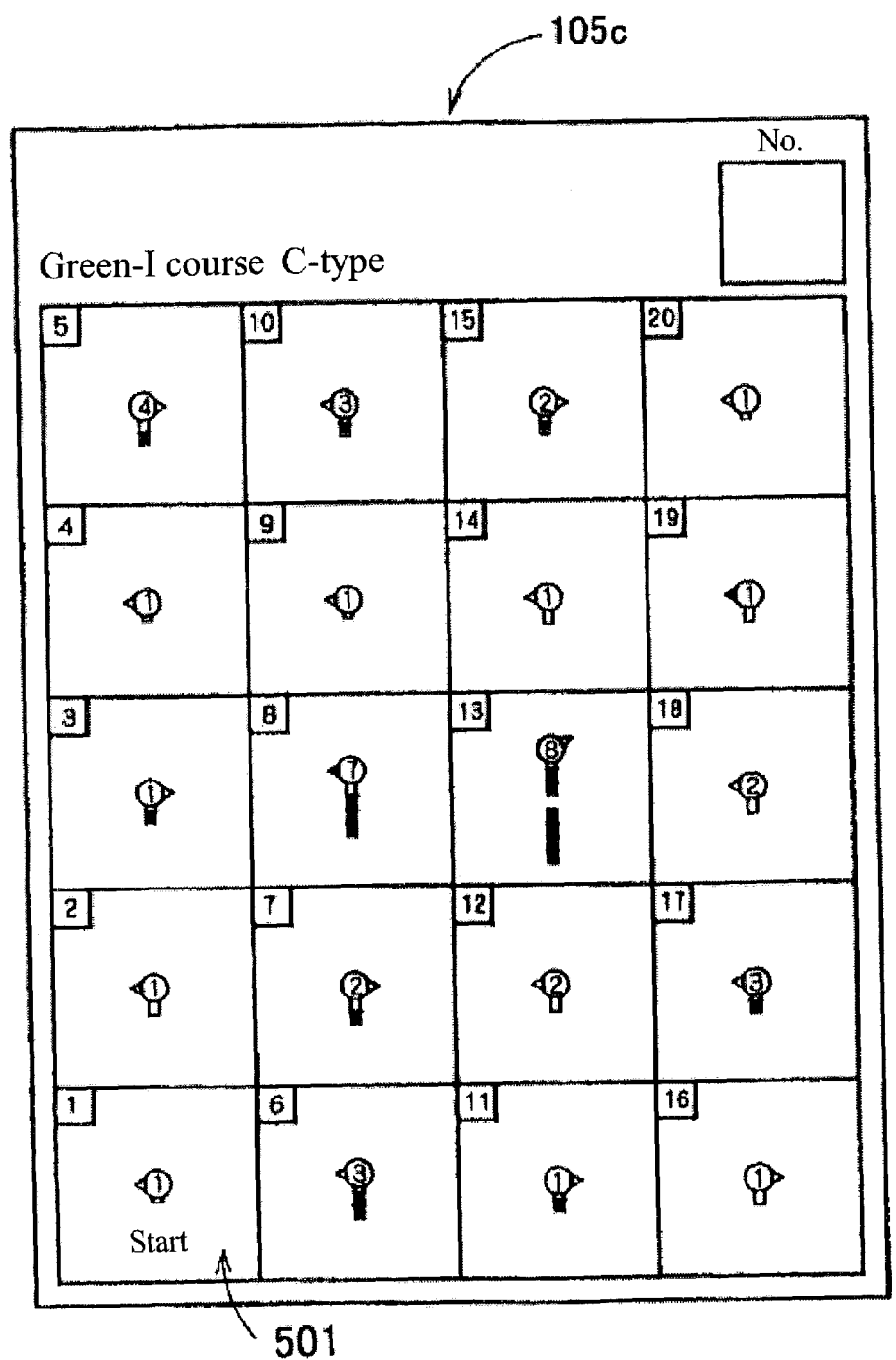
FIG. 4 is an explanatory view showing a segment diagram according to an embodiment of the present invention.

Among the segment diagrams, as shown in FIGS. 2 to 4 are three segment diagrams 105a to 105c for the green-I course.

In the segment diagrams 105a to 105c, patterns depicted in segments differently and abstractly indicate, in order of numbers from the start, intersections appearing along the course and directions to follow at the intersections. In FIG. 1, at the start, a pair of members (for example, No. 1 and No. 2) from a team and a pair of members (for example, No. 3 and No. 4) from another team simultaneously start. As explained already, No. 1 and No. 2 advance along the green-I and II courses, and No. 3 and No. 4 advance along the pink-I and II courses.

The segment diagrams 105*a* to 105*c* are provided with different prices. Namely, the segment diagram 105*a* is 6,000 dollars, the segment diagram 105*b* is 2,000 dollars, and the segment diagram 105*c* is 8,000 dollars. Each of the participants purchases a segment diagram before starting. To purchase the segment diagram, dummy money cards are used.

Figure 5:
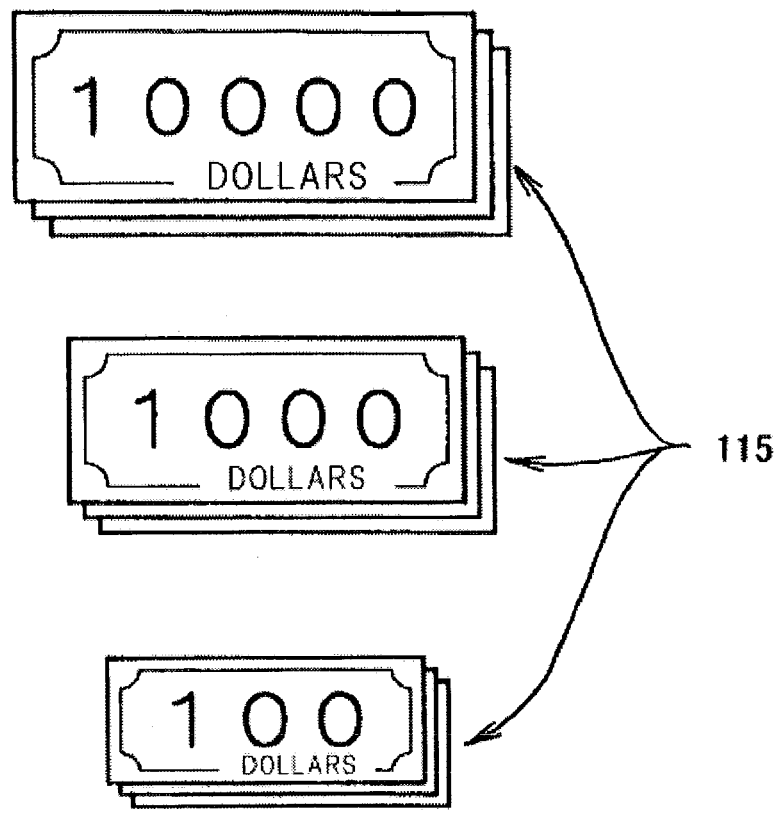
FIG. 5 is an explanatory view showing money cards according to an embodiment of the present invention.

FIG. 5 shows dummy money cards 115 used for the work model.

In the example of FIG. 5, a dollar is used as a unit. Values on the money cards are not limited to those shown. The sizes and colors of the money cards are different depending on the values of the money cards. A participant borrows money cards from the organizer and purchases one of the segment diagrams 105*a* to 105*c*. Expenses for the purchase are recorded as an "information cost."

According to the education set of the embodiment, information on the segment diagrams 105*a* to 105*c* is insufficient to reach the goal. For example, some segment diagram elements 501 for intersections appearing on the course are missed and must be supplemented with supplemental information, i.e., "supplemental segment diagrams" (hereinafter referred to as "insert diagrams"). Namely, an insert diagram shows a work guide or work contents to supplement a segment diagram. Obtaining the insert diagrams will be explained. At the points IP102 (2IP, 4IP, 5IP, 7IP, 9IP, 10IP in FIG. 1) on the course along which a member advances, there are insert diagrams necessary for making the partner of the member advance along the partner's course. A member (for example, No. 1) obtains an insert diagram for the partner (for example, No. 2), and in the middle of the course, must meet the partner (No. 2) and hand insert diagram over to the partner. An insert diagram necessary for the member is obtained by the partner (No. 2) on the course of the partner, and in the middle of the course, must be handed over to the member. Otherwise, the team member is unable to obtain the supplemental information.

Figure 6:
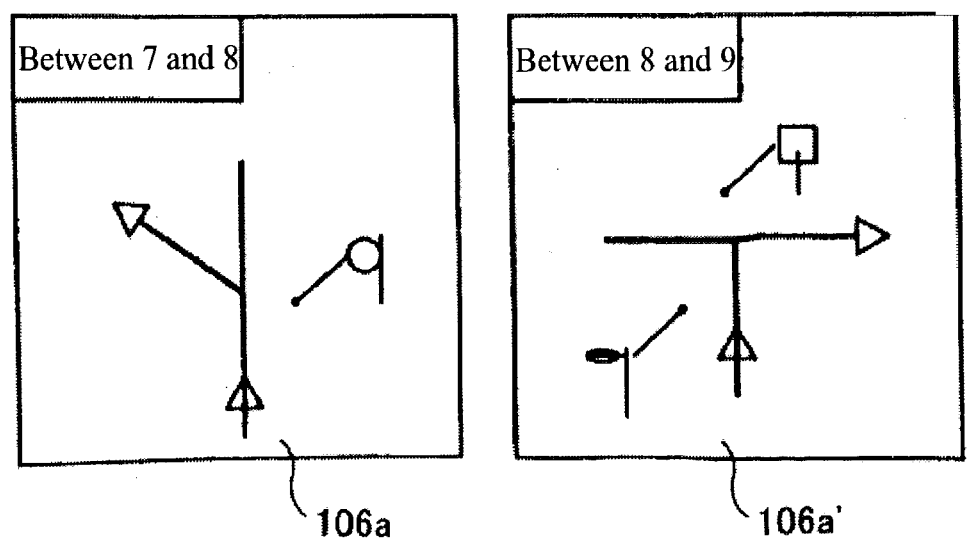
FIG. 6 is an explanatory view showing insert diagrams according to an embodiment of the present invention.
Figure 7:
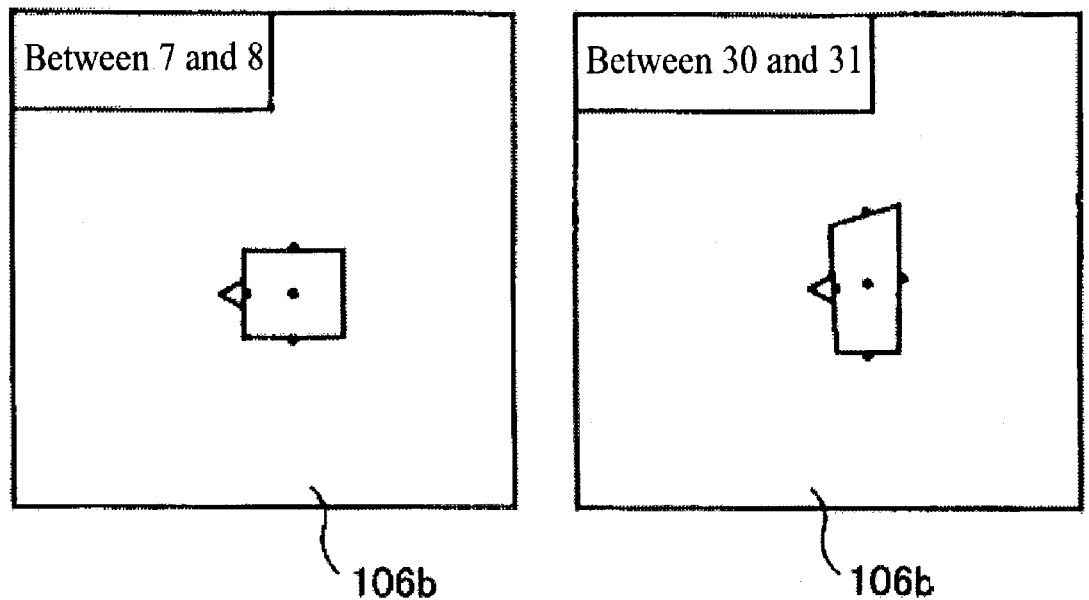
FIG. 7 is an explanatory view showing insert diagrams according to an embodiment of the present invention.
Figure 8:
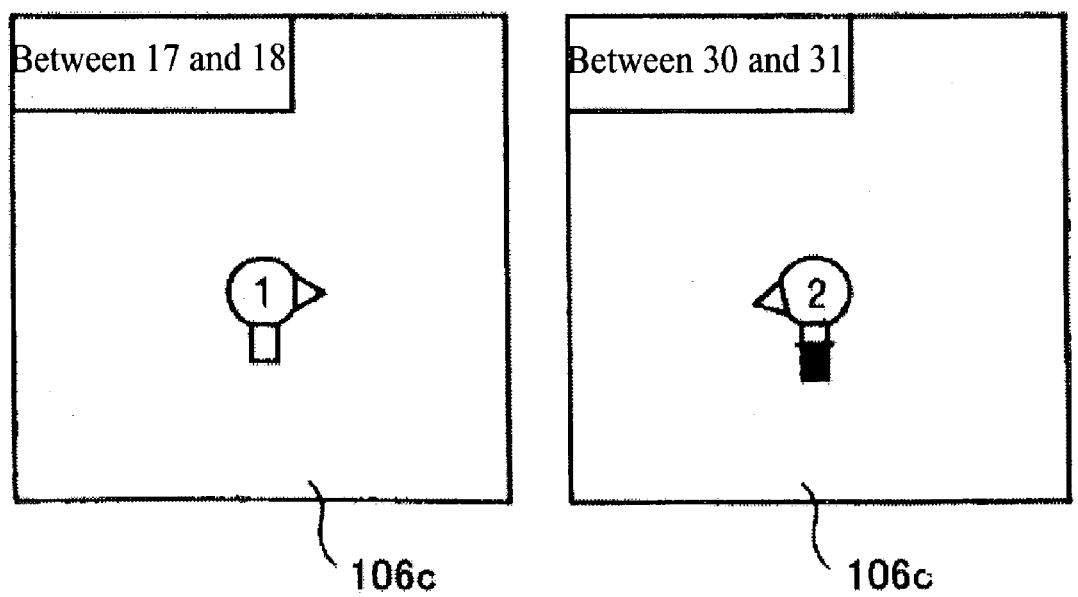
FIG. 8 is an explanatory view showing insert diagrams according to an embodiment of the present invention.

FIGS. 6 to 8 show insert diagrams.

Two insert diagrams 106*a* and 106*a*' of FIG. 6 supplement the segment diagram 105*a*. Two insert diagrams 106*b* and 106*b*' of FIG. 7 supplement the segment diagram 105*b*. Two insert diagrams 106*c* and 106*c*' of FIG. 8 supplement the segment diagram 105*c*. Each insert diagram such as 106*a* has, in the top left thereof, an instruction showing a position on the segment diagram 105*a* where the insert diagram 106*a* must be inserted (the insert diagram 106*a* being inserted "between 7 and 8").

The insert diagram such as 106*a* has an adhesive back with a strip sheet. The strip sheet is removed and the insert diagram is sequentially attached to an IP pass sheet serving as a sheet to record progress in the series of work stages.

Figure 10:
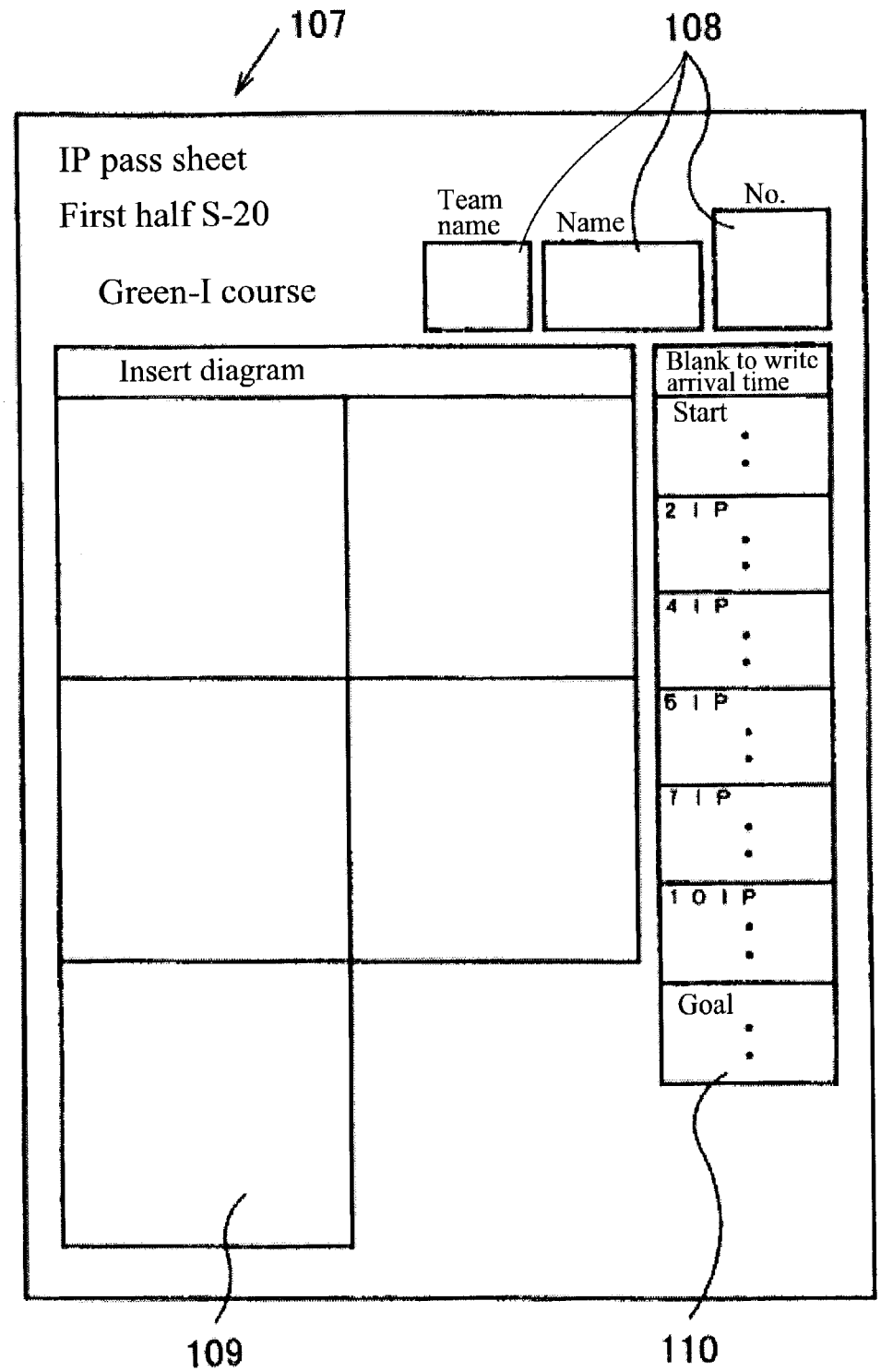
FIG. 10 is an explanatory view showing an IP pass sheet according to an embodiment of the present invention.

FIG. 10 shows an example of the IP pass sheet 107.

The IP pass sheet 107 is handed over to each participant free of charge before starting. An upper part thereof includes columns to write a team name, a name, and a number, and a lower left part thereof includes columns 109 to attach insert diagrams (supplemental information) such as 106*a*. A lower right part thereof includes columns 110 to record completion time of each stage (IP arrival time in this example).

At the VIPs and goal (FIG. 1) on each course, there are money cards of predetermined values. If two conditions are met, namely (1) that two members of a pair are present and (2) that the pair has arrived at the point faster than a simultaneously started pair of another team, a person in charge of the VIP sent from the organizer hands money cards (scores) over to the faster pair. The pair arriving at the point later than the faster pair is unable to receive the money cards. A value of the obtained money cards is halved and each half is recorded as the sales of each member of the pair.

Each VIP is provided with a "standard work completion time sheet" (a VIP money card obtain table in this example). This sheet shows numbers assigned for participants and the time at which money cards are obtainable (standard work completion time) corresponding to the numbers.

FIG. 9 shows an example of the VIP money card obtain table 111 (for the 3VIP).

If a pair of members with given numbers arrive at the point before the time specified on the sheet, money cards are not handed over to them on arrival. Instead, the money cards are given to them at the specified time. No such restrictions are set for the goal.

The "time when money cards are obtainable" is set so that a participant may arrive at the VIP if the participant follows a route from the start to the VIP at a predetermined advancing speed. Advancing speeds are specified in advance, for example, for the intervals between the start and IP, between IP and VIP, between VIP and IP, and between IP and the goal.

According to the work model based on the education set of the embodiment, a time cost of each participant is computed from the start time and arrival time at the IPs, VIPs, and goal and is added to expenses (cost) of the participant. Namely, course advancing speeds are specified for intervals between the start, IPs, VIPs, and goal, respectively, and the set arrival time at the IPs, VIPs, and a goal is computed for each participant in advance according to the intervals assuming that the participant travels according to course information such as the segment diagram 105*a* and supplemental information such as the insert diagram 106*a* and at the advancing speeds specified for the intervals. The actual start time at the start and the actual arrival time at the goal are recorded by the organizer. The arrival time at an IP is recorded by a participant in the arrival time column 110 on the IP pass sheet 107. The arrival time at an IP recorded by a participant may be different from the actual time.

After the completion of a course, the difference between the set time for each interval of the course and the time computed from the arrival time of a participant at each point recorded on the IP pass sheet 107 by the participant is computed. A total time difference (before or after the set time) is converted into an amount of money with, for example, 100 dollars per minute. The amount of money is recorded as a time cost in determining a result of the member. According to the embodiment, only the arrival time at an IP is recorded, and elapsed time between IPs is used as a time cost. Instead, only the arrival time at a VIP instead of an IP may be recorded to compute the elapsed time between the start and a VIP, between VIPs, and between a VIP and the goal. Alternatively, the elapsed time between IPs and between VIPs may be computed.

Figure 11:
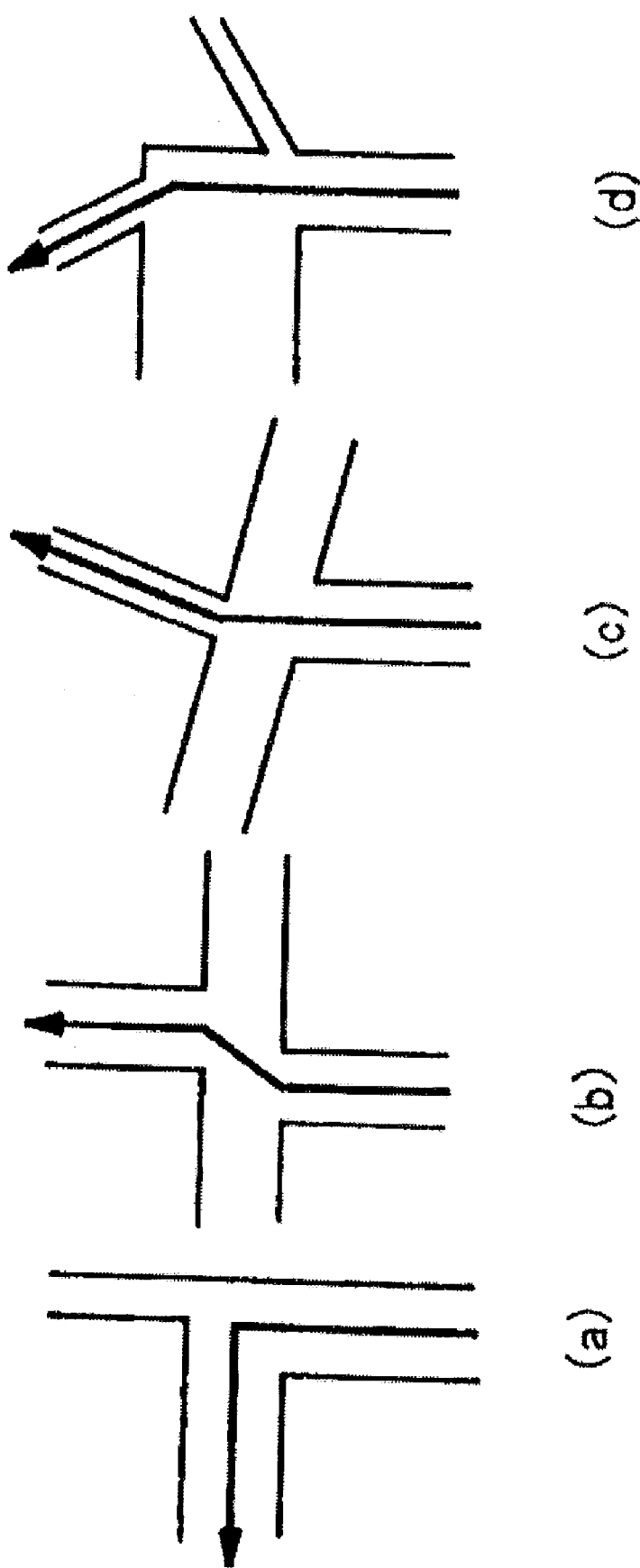
FIGS. 11(a), (b), (c), and (d) are explanatory views showing roads to follow in connection with the use of the education set of the embodiment.
Figure 13:
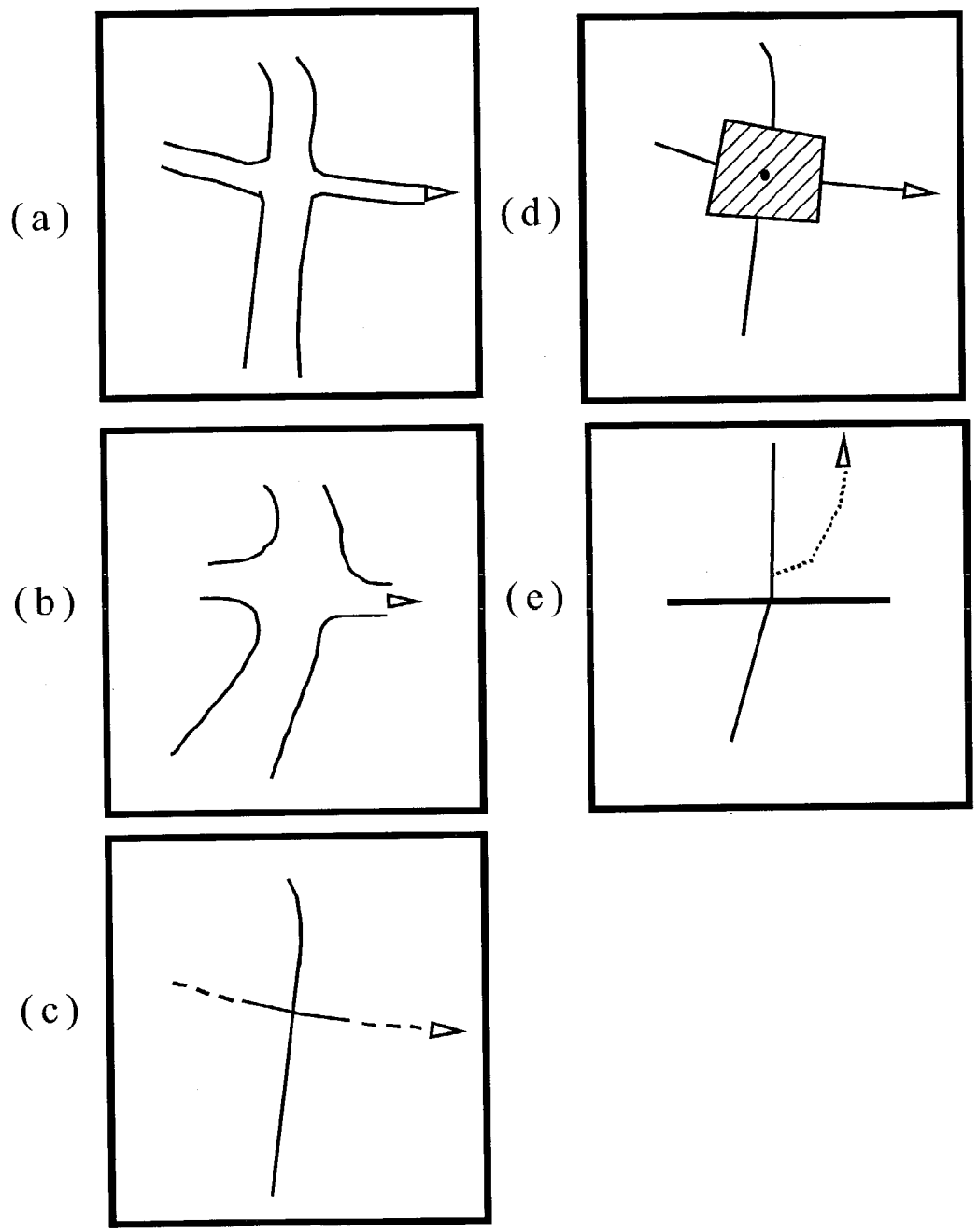
FIG. 13 is an explanatory view showing segment diagram elements according to an embodiment of the present invention.
Figure 15:
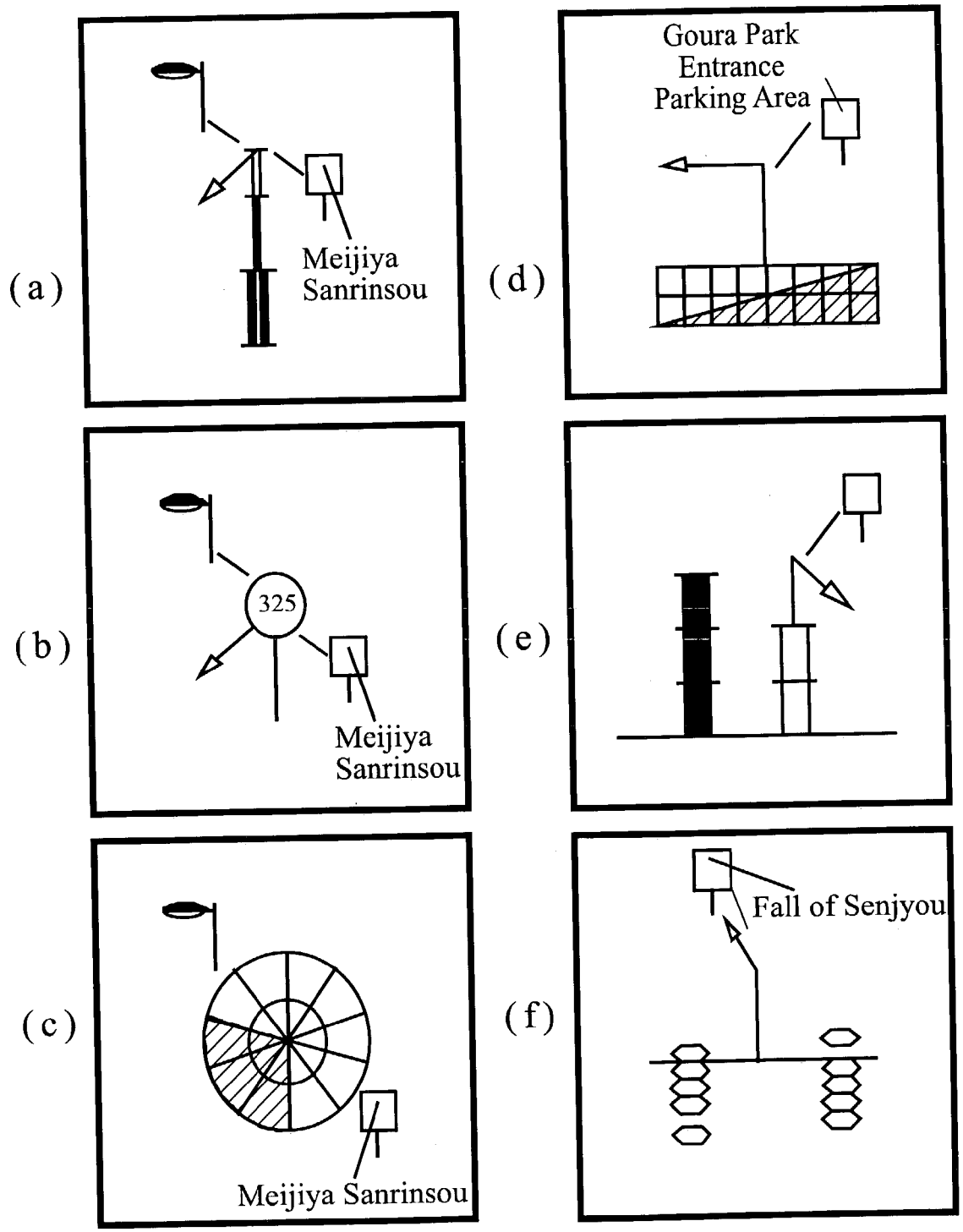
FIG. 15 is an explanatory view showing segment diagram elements according to an embodiment of the present invention.

If a participant passes an intersection not shown on the segment diagram 105*a* and insert diagram 106*a* and the like, the participant must follow a road according to predetermined rules. To "advance as the road goes (follow the road)" means (1) if there is a road having the same width as a road along which the participant has come and other roads having different widths as shown in FIG. 11(*a*), the road having the same width must be chosen to follow, (2) if there are a plurality of roads having widths similar to the width of the followed road as shown in FIG. 11(*b*), the straightest road must be chosen to follow, and (3) if there is no road like the followed road as shown in FIG. 11(d), the straightest road must be chosen to follow. These are the rules to follow when advancing along a course.

Supplemental information for traveling along a course is provided by signboards installed at IPs and VIPs.

For example, as shown in FIG. 12, signboards 112 and 113 at IPs and a signboard 114 at a VIP each show a course name, point number, direction to follow, and advancing speed.

Each participant (for example, No. 1) must obtain, for example, the insert diagram 106a that has supplemental information necessary for the partner (for example, No. 2), and therefore, the participant advances while analyzing the segment diagram 105a and the like, reaches an IP on a course, and obtains the insert diagram 106a and the like for the partner (No. 2), in order to arrive at VIPs and the goal faster than a competing pair and receive money cards. Each participant (for example, No. 1) encounters the partner (for example, No. 2) of the same pair at a VIP, and there, hands the obtained insert diagram 106a and the like over to the partner (No. 2), receives the insert diagram 106a' for himself or herself from the partner (No. 2), and attaches the insert diagram to the IP pass sheet 107. In this way, each participant advances along the respective course toward the goal.

A time-out will be given to a participant if a predetermined time passes after starting, and at that moment, the participant must terminate work even before the goal is reached. Money cards obtained by a pair unable to reach the goal will be zeroed if a simultaneously started competing pair arrives at the goal. Half of the amount of the obtained money cards of the failed pair is added to an amount of money cards of the competing pair. If the simultaneously started competing pair is also unable to reach the goal, the amount of obtained money cards is halved. In this way, rules are set and enforced.

When all pairs finish their work in such a way, the sales (points) of each pair and the expenses of each member are used to compute individual and team results.

As explained above, the sales are the total of money cards (points) obtained by each pair at VIPs and the goal. The individual sales are half the sales of a pair. According to this example, an amount of money cards obtainable by a pair at each VIP is 20,000 dollars, and money cards are obtainable at the three VIPs and goal. Accordingly, the maximum sales of a pair will be 80,000 dollars.

Costs to be recorded include information cost and time cost. The information cost is an amount of money paid to purchase the segment diagram 105a and the like. The time cost is, as explained already, an amount of money computed by finding the difference between the time set for point-to-point intervals and the elapsed time computed from records on the IP pass sheet 107 and by converting the difference at the rate of 100 dollars per minute into an amount of money.

An individual result is computed from the following expression (1), and the individual results are sorted in order, to obtain Table 1, which shows the ranking of individual results.

$$\text{Individual result} = \text{sales} \times \frac{1}{2} - (\text{information cost} + \text{time cost}) \qquad (1)$$

TABLE 1

| Ranking | No. | Team name | Name | Sales | Information cost | Time cost | Result |
|---|---|---|---|---|---|---|---|
| 1 | 15 | B1 | Ohta | 40,000 | 6,000 | 2,900 | 31,100 |
| 2 | 16 | B1 | Tasaki | 40,000 | 6,000 | 3,500 | 30,500 |
| 3 | 31 | B2 | Sakikawa | 40,000 | 6,000 | 3,650 | 30,350 |
| 4 | 32 | B2 | Kohno | 40,000 | 6,000 | 3,650 | 30,350 |
| 5 | 26 | B1 | Nojima | 35,000 | 6,000 | 2,400 | 26,600 |
| 6 | 25 | B1 | Simai | 35,000 | 6,000 | 2,500 | 26,500 |
| 7 | 11 | B2 | Inoue | 35,000 | 6,000 | 3,950 | 25,050 |
| 8 | 12 | B2 | Kamihirayama | 35,000 | 6,000 | 15,750 | 13,250 |
| 9 | 4 | B1 | Ito | 10,000 | 6,000 | 5,850 | −1,850 |
| 10 | 3 | B1 | Hatada | 10,000 | 6,000 | 6,800 | −2,800 |
| 11 | 7 | A2 | Kiyono | 5,000 | 6,000 | 5,550 | −6,550 |
| 12 | 22 | B1 | Murayama | 5,000 | 6,000 | 5,600 | −6,600 |
| 13 | 19 | A1 | Fujiwara | 5,000 | 6,000 | 5,650 | −6,650 |
| 14 | 23 | A2 | Sasaki | 5,000 | 6,000 | 5,850 | −6,850 |
| 15 | 5 | B2 | Ogawa | 5,000 | 6,000 | 5,900 | −6,900 |
| 15 | 17 | B2 | Nagai | 5,000 | 6,000 | 5,900 | −6,900 |
| 17 | 24 | A2 | Ikeda | 5,000 | 6,000 | 5,950 | −6,950 |
| 18 | 8 | A2 | Miura | 5,000 | 6,000 | 6,000 | −7,000 |
| 19 | 6 | B2 | Kotegawa | 5,000 | 6,000 | 6,100 | −7,100 |
| 19 | 18 | B2 | Sasayama | 5,000 | 6,000 | 6,100 | −7,100 |
| 21 | 28 | A1 | Kitamura | 0 | 2,000 | 5,550 | −7,550 |
| 22 | 20 | A1 | Kobayashi | 5,000 | 6,000 | 6,650 | −7,650 |
| 23 | 9 | A1 | Shinno | 0 | 2,000 | 5,750 | −7,750 |
| 24 | 21 | B1 | Hamada | 5,000 | 6,000 | 7,050 | −8,050 |
| 25 | 27 | A1 | Ozeki | 0 | 2,000 | 6,500 | −8,500 |
| 26 | 10 | A1 | Tashiro | 0 | 2,000 | 7,200 | −9,200 |
| 27 | 30 | A2 | Shimojyo | 0 | 6000 | 5,250 | −11,250 |
| 28 | 29 | A2 | Hongou | 0 | 6000 | 5,350 | −11,350 |
| 29 | 1 | A1 | Nakao | 0 | 6000 | 5,600 | −11,600 |
| 29 | 2 | A1 | Odawara | 0 | 6000 | 5,600 | −11,600 |
| 31 | 13 | A2 | Nakai | 0 | 6,000 | 5,900 | −11,900 |
| 32 | 14 | A2 | Suzuki | 0 | 6,000 | 6,300 | −12,300 |

The above-mentioned individual results are totaled for teams to provide team results. The team data is shown in the following Table 2. As a result, individuals may feel a sense of accomplishment or a sense of humiliation that individual contribution to the team was insufficient.

TABLE 2

| Ranking | Team name | Leader | Sales | Information cost | Time cost | Result | Per person |
|---|---|---|---|---|---|---|---|
| 1 | B1 | Sekino | 180,000 | 48,000 | 36,600 | 95,400 | 11,925 |
| 2 | B2 | Yoshikawa | 170,000 | 48,000 | 51,000 | 71,000 | 8,875 |
| 3 | A1 | Sugawara | 10,000 | 32,000 | 48,500 | −70,500 | −8,813 |
| 3 | A2 | Hosoi | 20,000 | 48,000 | 46,150 | −74,150 | −9,269 |

In this way, the work model employing the education set of the embodiment lets participants separately advance along courses according to their own decisions, the courses partly overlapping and being generally different from one another to require the autonomy of the participants. Not only individual decisions but also responsibility and a sense of mission that no trouble is given to the other member (partner) of a pair are needed for each participant because no money cards are obtainable at VIPs and the goal if one of the members of a pair is not present. The ranking of team results is provided at the end, to motivate the members of each team to try hard for a team result and not to allow the other members of the same team to work irresponsibly.

The participants are individually required to understand the information abstractly expressed on the segment diagrams 105 and the like, obtain the insert diagrams 106a and the like serving as supplemental information at IPs on the way of a course, and pay attention to the set arrival time. The participants must study many such elements that are intricately combined, and consciously and intentionally advance. This will inevitably train the analysis, decision making, and performance abilities of individuals and organizations.

The education set of this embodiment has the above-mentioned characteristics to bring out the recognition, analysis, and fragmented-information-integration abilities of an individual. The education set requires an individual to use all knowledge from both the conscious and subconscious states. Results provided by the education set directly reflect the degrees of individual and organizational intellectual creativity including analyzing, integrating, decision making, countermeasures preparing, sharing, and executing abilities.

With the education set of this embodiment, one can efficiently experience that important factors for improving performance are not only individual physical strength and abilities including past knowledge but also the finding of a work-model structure (rules prepared by an organizer such as road definitions and indications, signs, and marks on segment diagrams), the preparation of countermeasures (such as a way of reading the segment diagrams for actions, a way of confirming a course to be followed, and a way of meeting at each point) to cope with the work-model structure, the sharing of knowledge and information among members in the same team, the grasping of members' characteristics (merits and demerits), the assigning of roles for the members in the team, the formation of pairs in the team, and the devising of how to wait for the partner in practice, etc. The education set is easy to understand for everybody and is very advantageous because it does not rely on an individual's nature, such as age or physical strength.

Unlike the conventional training methods including business games, orienteering, walk rally, and F1, the education set can let individuals understand the essence of work through experience and provide a multiplier effect of improving individual and organizational abilities. The education set can give participants a quite meaningful experience.

According to the work model employing the education set of this embodiment, the second-type point (VIP) allows, as mentioned above, the members of a pair to exchange supplemental information with each other. This is useful when setting courses. As shown in FIG. 10, a piece of supplemental information is attached to the IP pass sheet so that a person in charge at a VIP may easily check to see whether or not a participant has correctly obtained the supplemental information. As mentioned above, an advancing speed and an advancing direction at each interval are specified at each of the start and first and second-type points. This reflects an essence of work because situations change during the progress of work and one must grasp and cope with such changes whenever they occur. For this purpose, as shown in FIG. 12, signboards are installed at IPs and VIPs, to indicate advancing speeds and directions. The money card obtaining time is the arrival time set for a second-type point and is computed from an interval and an advancing speed, to improve the efficiency of course setting. For this purpose, the money card obtain table of FIG. 9 is used to show the set arrival time. The money-card obtaining time may be not only the arrival time set for a second-type point and computed from an interval and an advancing speed but also wait time. This corresponds to wait time that occurs in usual work without regard to the intention of a person in charge of the work.

In the above-mentioned example, there are four courses (green-I, green-II, pink-I, and pink-II) each involving three segment diagrams (A-type, B-type, and C-type), i.e., 12 segment diagrams in total (the 12 segment diagrams involving corresponding insert diagrams). These diagrams may be changed as and when required.

In the above-mentioned example, four courses are set for two pairs. Course types may properly be set according to the number of participants and training time. Naturally, if the number of participants is small, two to three participants from different teams may compete with each other on a single course. In this case, someone who rarely makes his or her own decision may cheat by following a competitor. This deteriorates the effect of forming autonomy of a participant. It is preferable, therefore, that participants who simultaneously start select separate courses. To provide intricacy, it is preferable to set a plurality of courses.

In connection with elements on the segment diagrams, there are three types of segment diagrams such as 105a written in different methods to show information about a course. The number of segment-diagram types is not particularly limited and may be only one. Different information writing methods include different information costs. To let participants recognize this, it is preferable to prepare, as mentioned above, a plurality of types of course information (segment diagrams) written in different methods for each course. Making a participant pick up one of the pieces of course information provides a greater effect because the participant must independently choose a way of handling work. A method of writing information on a segment diagram such as 105a is not limited to the examples mentioned above. Any information that is abstract to some extent and is capable of generally identifying an intersection is acceptable.

FIGS. 13 to 16 show other examples of elements of segment diagrams or supplemental information (insert diagrams).

FIG. 13(a) is a plan view typically showing an intersection where one must advance in a direction other than the direction in which the road goes. FIG. 13(b) typically shows the shapes of roads at an intersection seen from a given distance (for example, 20 m) before the intersection. FIG. 13(c) is a modification of FIG. 13(b), using a dotted line to indicate a road that until 20 m therefrom. FIG. 13(d) shows an intersection with a polygon and the center of gravity thereof with a dot. FIG. 13(e) employs line thicknesses and line types (such as a dotted line) to indicate, for example, road widths and conditions.

FIG. 14(a) shows, with squares, intersections where one must advance "as the road goes" between "a given intersection" and "an intersection where one must advance in a direction other than the direction in which the road goes." Patterns in the squares indicate details (conditions, widths, directions, and the like) used when choosing a road to follow. FIG. 14(b) is a modification of FIG. 14(a), showing rightward lines, leftward lines, and dotted lines to indicate the details used when choosing a road to follow.

FIGS. 15(a) to (f) show various examples to indicate a distance between "intersections where one must advance in a direction other than the direction in which the road goes" and a direction to follow at an "intersection where one must advance in a direction other than the direction in which the road goes." FIG. 15(a) shows an example with a black rectangle representing a unit distance of 100 m and a white rectangle a unit distance of 10 m. FIG. 15(b) shows an example with an encircled number representing a distance. FIG. 15(c) shows an example with an inner circle representing a unit distance of 100 m and an outer circle a unit distance of 10 m. FIG. 15(d) shows an example with the area of a hatched triangle representing a distance. FIG. 15(e) is a modification of FIG. 15(a). FIG. 15(f) shows an example with a number indicated with abacus beads representing a distance. FIGS. 16(a) to (c) illustrate examples showing landmarks that are present along an interval between "intersections where one must advance in a direction other than the direction in which the road goes" and a direction to follow at an "intersection where one must advance in a direction other than the direction in which the road goes." FIG. 16(a) shows an example with the number of black rectangles representing the number of utility poles and the number of white rectangles the number of signals. FIG. 16(b) shows an example with the number of black rectangles representing the number of road signs and the number of white rectangles the number of pedestrian crossings. FIG. 16(c) shows an example with the number of squares under an arrow mark representing the number of lighting poles.

Table 3 summarizes the elements appearing in segment diagrams.

TABLE 3

Figure 21:
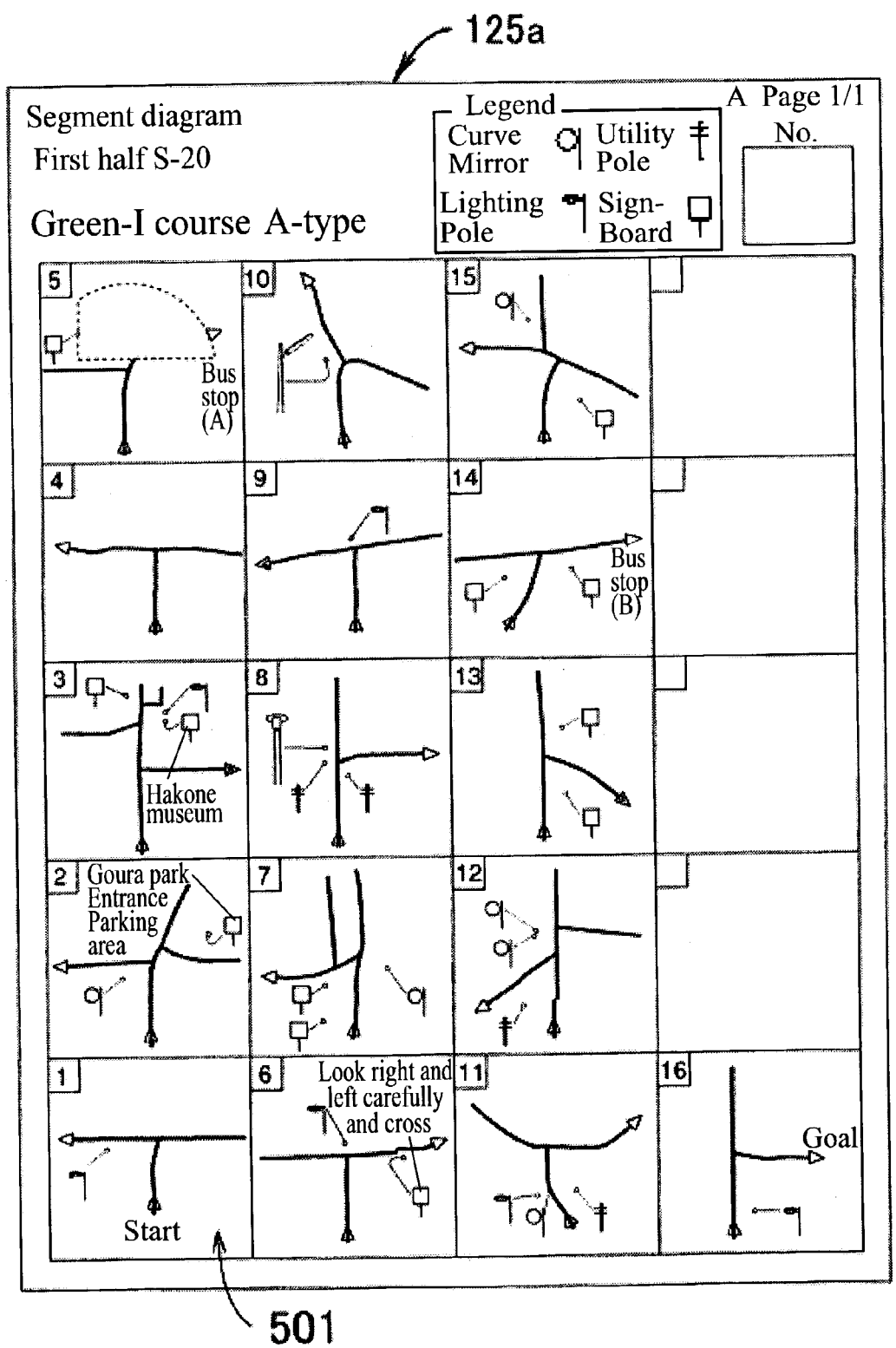
FIG. 21 is an explanatory view showing a segment diagram according to an embodiment of the education set of the present invention.
Figure 22:
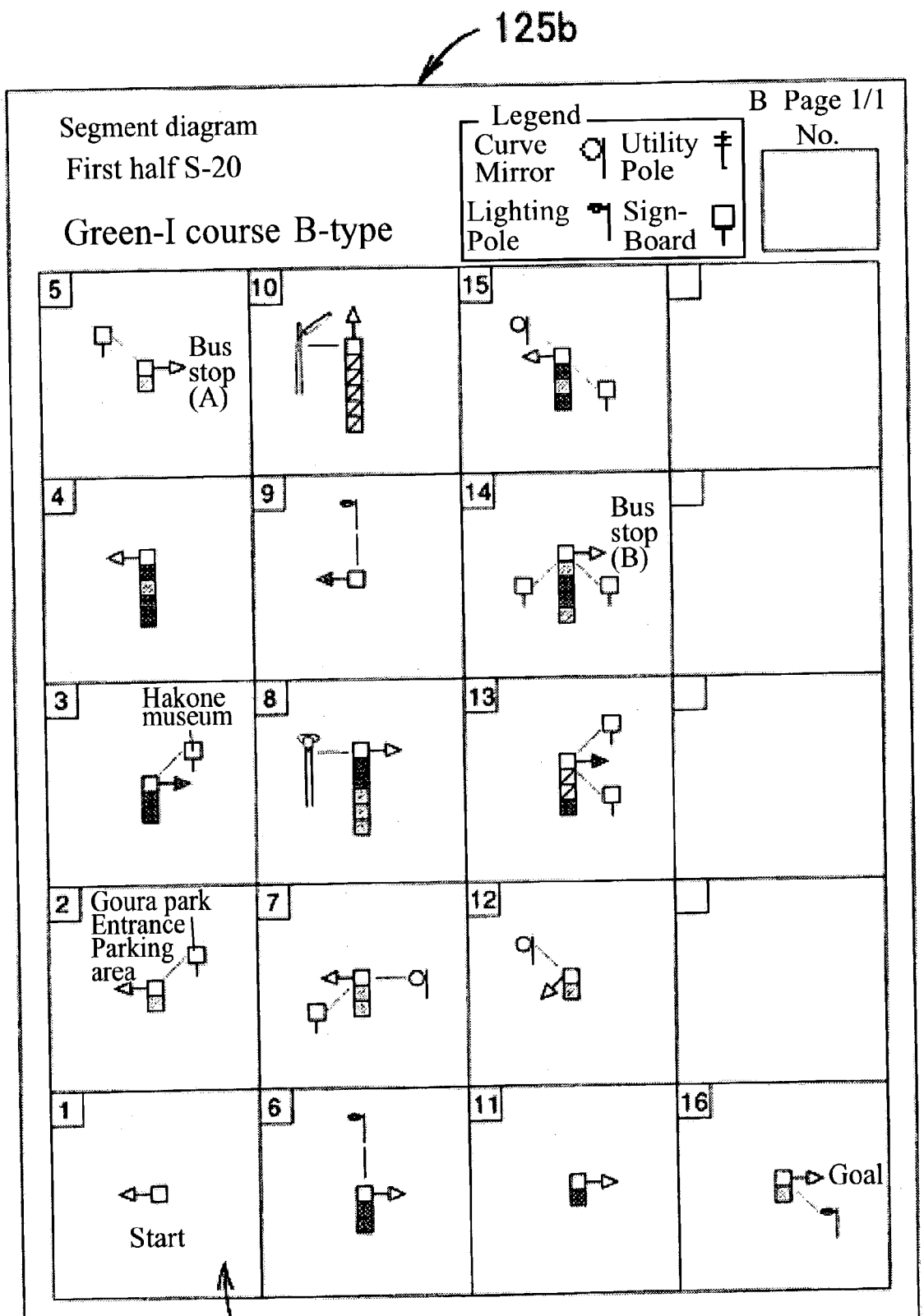
FIG. 22 is an explanatory view showing a segment diagram according to an embodiment of the education set of the present invention.
Figure 23:
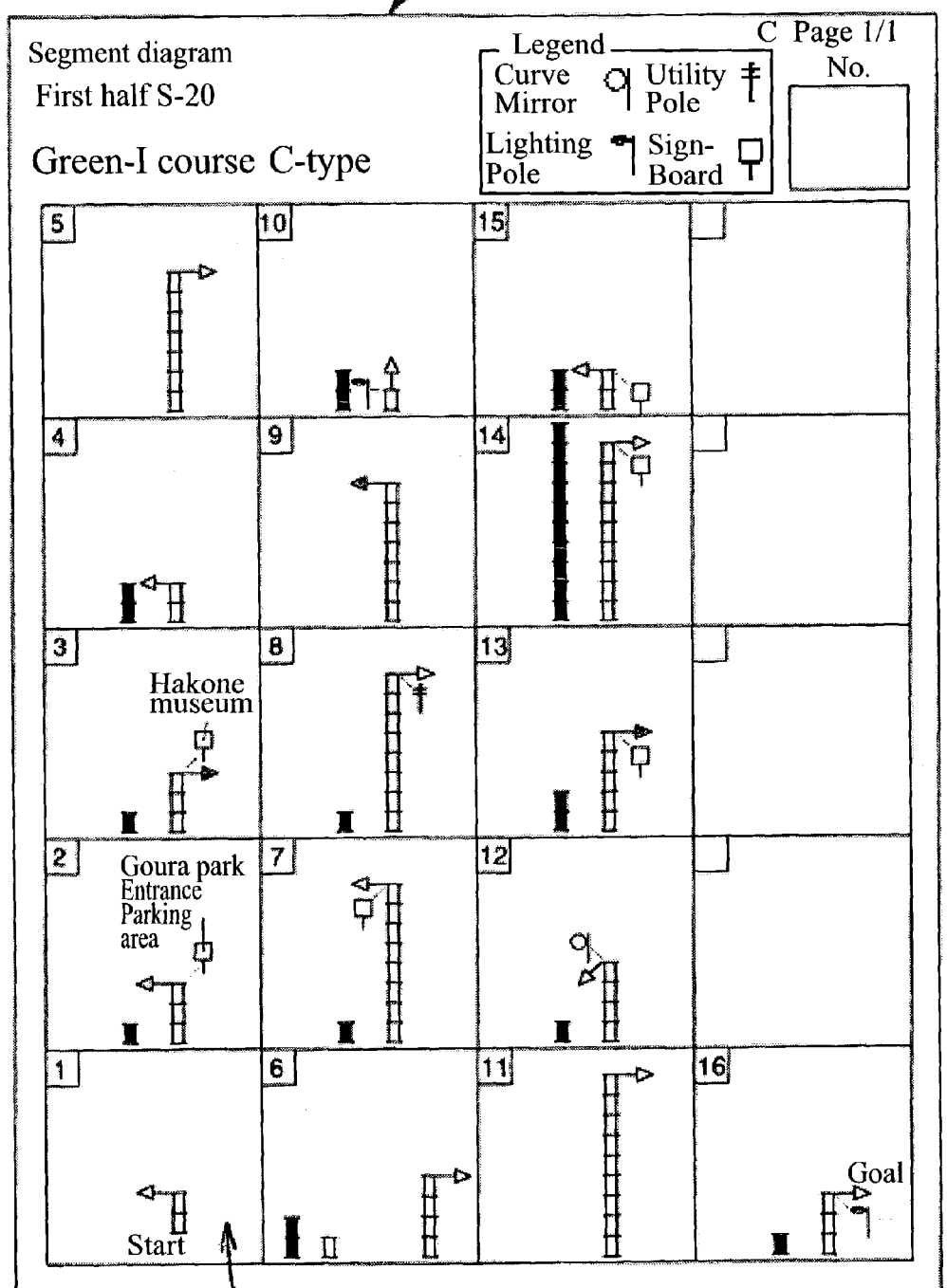
FIG. 23 is an explanatory view showing a segment diagram according to an embodiment of the education set of the present invention.
Figure 24:
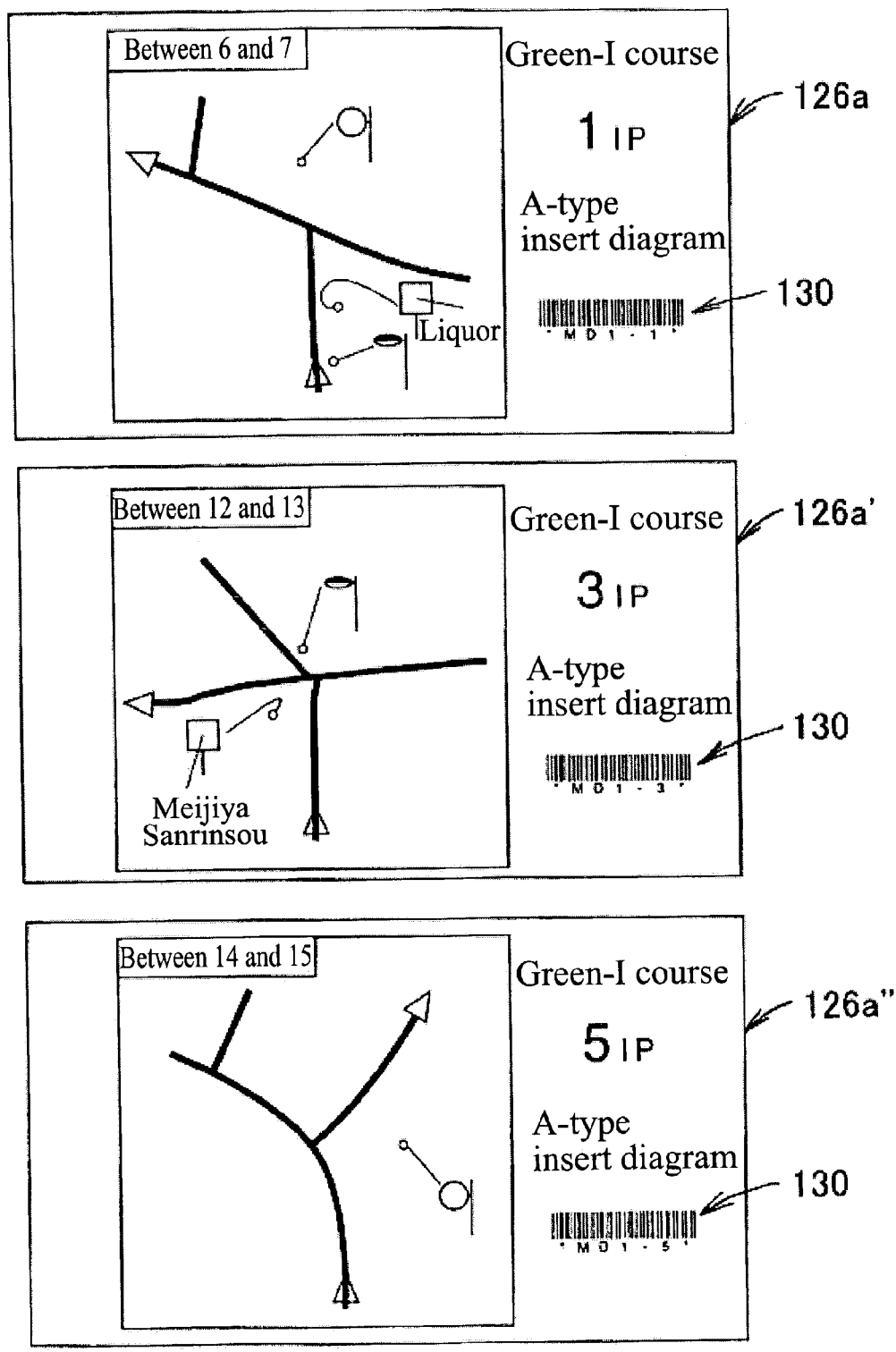
FIG. 24 is an explanatory view showing insert diagrams with bar codes according to an embodiment of the education set of the present invention.
Figure 26:
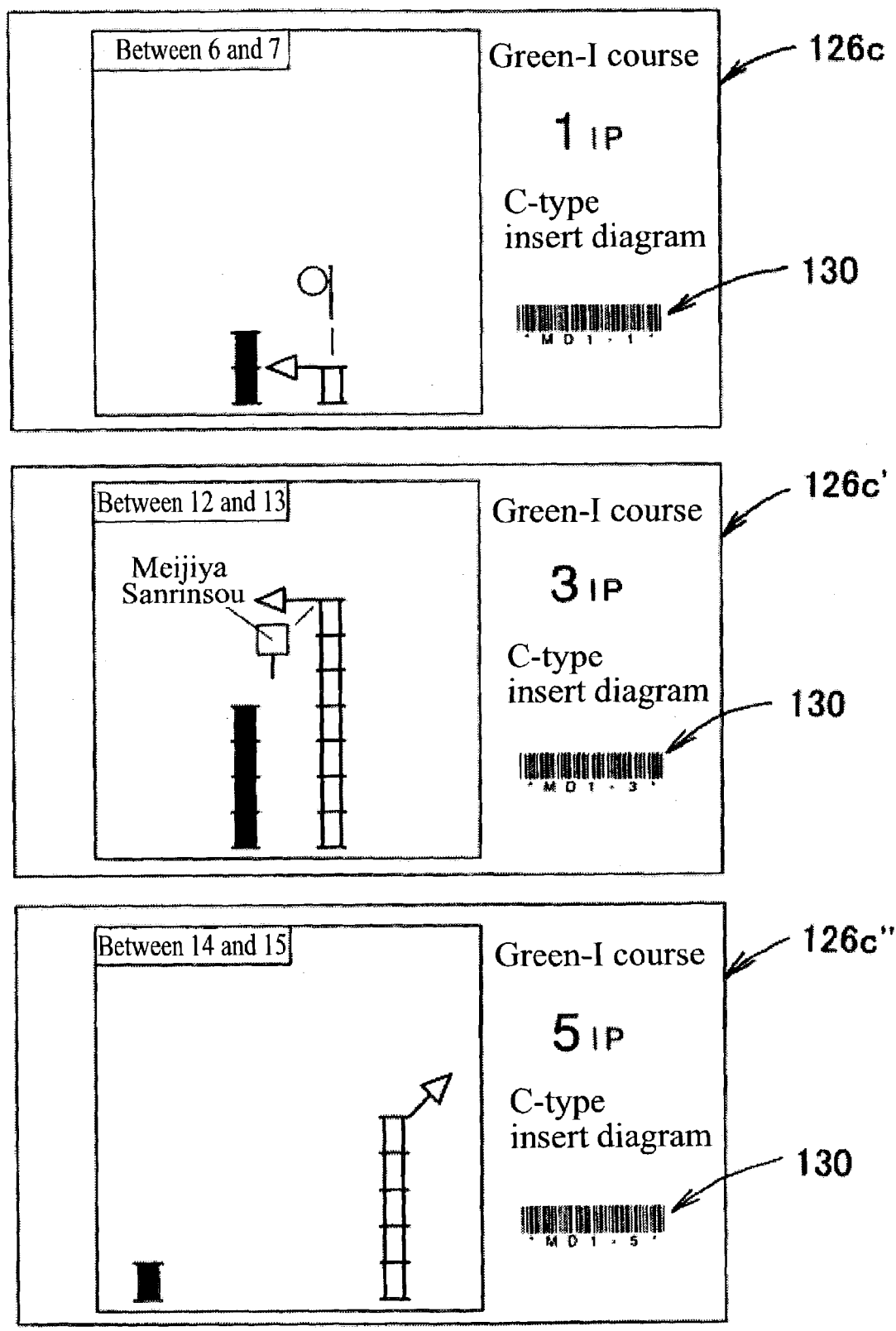
FIG. 26 is an explanatory view showing insert diagrams with bar codes according to an embodiment of the education set of the present invention.

| | Showing information about intersection where one must advance in a direction other than the direction in which the road goes | | | Showing information about interval between intersections where one must advance in a direction other than the direction in which the road goes | | |
|---|---|---|---|---|---|---|
| | The number and angles of roads | Intersection shape | Landmark | Conditions for choosing "as the road goes" | Distance | Landmark |
| FIG. 2 | ○ | | ○ | | | |
| FIG. 3 | | ○ | | | | |
| FIG. 4 | | | | | ○ | |
| FIG. 13(a) | ○ | ○ | | | | |
| FIG. 13(b) | ○ | ○ | | | | |
| FIG. 13(c) | ○ | | | | | |
| FIG. 13(d) | ○ | ○ | | | | |
| FIG. 13(e) | ○ | | | | | |
| FIG. 14(a) | | | | ○ | | |
| FIG. 14(b) | | | | ○ | | |
| FIG. 15(a) | | | | ○ | ○ | |
| FIG. 15(b) | | | | ○ | ○ | |
| FIG. 15(c) | | | | ○ | ○ | |
| FIG. 15(d) | | | | ○ | ○ | |
| FIG. 15(e) | | | | ○ | ○ | |
| FIG. 15(f) | | | | ○ | ○ | |
| FIG. 16(a) | | | | ○ | | ○ |
| FIG. 16(b) | | | | ○ | | ○ |
| FIG. 16(c) | | | | ○ | | ○ |
| FIG. 21 | ○ | | ○ | | | |
| FIG. 22 | | ○ | ○ | | | |
| FIG. 23 | ○ | | | | ○ | |
| Comparative example 1 | Maps made by Geographical Survey Institute (clearly showing general arrangement of roads, approximate road widths, and landmarks) | | | | | |
| Comparative example 2 | Showing directions to follow for all intersections including those where one can advance as the road goes | | | | | |
| Comparative example 3 | Showing distances and directions to follow between all intersections including those where one can advance as the road goes | | | | | |

As shown in Table 3, the segment-diagram elements are largely classified into (1) those to identify intersections where one must advance in a direction other than the direction in which the road goes and (2) those to show information concerning intervals between intersections where one must advance in a direction other than the direction in which the road goes. The elements (1) are pieces of information to identify such intersections and are classified into information showing the numbers and angles of roads, information showing the shapes of the intersections, information showing landmarks (for example, the locations, numbers, and contents of utility poles, lighting poles, and signboards), and the like. The elements (2) are classified into information showing conditions for choosing a road to follow between intersections, information showing distances between intersections, information showing landmarks between intersections, and the like. As shown in Table 3, the segment-diagram elements are properly combined and used. For example, the elements in the segment diagram of FIG. 2 express the numbers and angles of roads at intersections where one must advance in a direction other than the direction in which the road goes and landmarks present at the intersections.

Namely, for "intersections where one must advance in a direction other than the direction in which the road goes," the segment diagrams and insert diagrams show at least one of the number of intersecting roads, the angles of the intersecting roads, center lines of the intersecting roads, widths of the intersecting roads, and signboards, utility poles, lighting poles, etc., (hereinafter called landmarks and the like) in the vicinity of the intersecting roads. Alternatively, the diagrams show at least one of a distance between "intersections where one must advance in a direction other than the direction in which the road goes," a choice rule for a road to follow at an intersection between the "intersections where one must advance in a direction other than the direction in which the road goes," and landmarks and the like existing between the "intersections where one must advance in a direction other than the direction in which the road goes."

FIG. 17 shows results of tests of "Recognition ratio of basic mechanism by first impression: answers to what given segment diagrams express and evaluation of correct answer ratio" and "Actual intersection recognition ratio: answers of intersections and directions to follow on actual courses and evaluation of correct answers" on a subject group 1 (32 males and females ranging from 16 to 19 years old), a subject group 2 (40 males and females ranging from 30 to 45 years old), and a subject group 3 (males and females ranging from 46 to 60 years old). FIG. 17 also shows results of similar tests carried out on comparative examples with (1) maps made by the Geographical Survey Institute, (2) maps showing directions to follow for all intersections (including those where one can advance as road goes), and (3) maps showing distances between all intersections and directions to follow at the intersections. As is apparent in FIG. 17, using the segment-diagram elements of the embodiment results in a low intersection recognition correct answer ratio compared with the basic mechanism recognition ratio by first impression. Namely, the mechanism of the embodiment is "simple at a glance but difficult in practice."

In the example mentioned above, the supplemental information relates to a part of a course (such as the insert diagram 106*a*). This does not limit the supplemental information. Any information related to all or part of a course information forming mechanism is acceptable. Acceptable examples include a direction to follow at a specific point, rules to advance along a course, the priority of roads when one must advance as the road goes, the definition of a road, a change after a specific point where rules are set, an indication mechanism for a specific landmark on a course, a mechanism for using supplemental information to indicate unnecessary information in the course information that is handed over to a member in advance, and a mechanism for using supplemental information that clarifies the correct order of segment diagrams that have been incorrectly arranged and which are handed over to a member in advance.

The arrangements, numbers, and functions (the availability of insert diagrams and money cards) of IPs and VIPs set along each course are properly determined. The way of forming indications on signboards is not particularly limited.

According to the above-mentioned example, participants obtain money cards at VIPs and the goal, and the money cards are recorded as sales. The "money cards" are only symbols. They may be point cards. For example, some points are obtainable at a predetermined place, some points are lost as a result of time loss, and the points are totaled to provide a result.

According to the above-mentioned example, a team result is a simple total of member results. Weighted result may be placed depending on variations among member results, or a minimum or maximum member result.

According to the above-mentioned example, two members form a pair. Instead, three or more members may form a group. If three-member groups are adopted, six courses including green-I, green-II, and green-III and competitor courses of pink-I, pink-II, and pink-III are prepared. Accordingly, 18 segment diagrams (of three types including A-type, B-type, and C-type) are prepared. Supplemental information (insert diagrams) is structured such that, for members A, B, and C, the member A obtains supplemental information for the member B, the member B obtains supplemental information for the member C, and the member C obtains supplemental information for the member A, each at an IP. If a team consists of 10 members, five pairs each of two members may be formed in the team, or two 3-member groups and two 2-member pairs may be formed in the team.

Each participant may have a bar code or an IC card corresponding to a number allocated for the participant, to automatically record arrival time at IPs, VIPs, and the goal. Insert diagrams set for each course may have bar codes or may be made of IC cards, to correctly and quickly determine, at a VIP or the goal, whether or not a participant has obtained a correct insert diagram.

Figure 18:
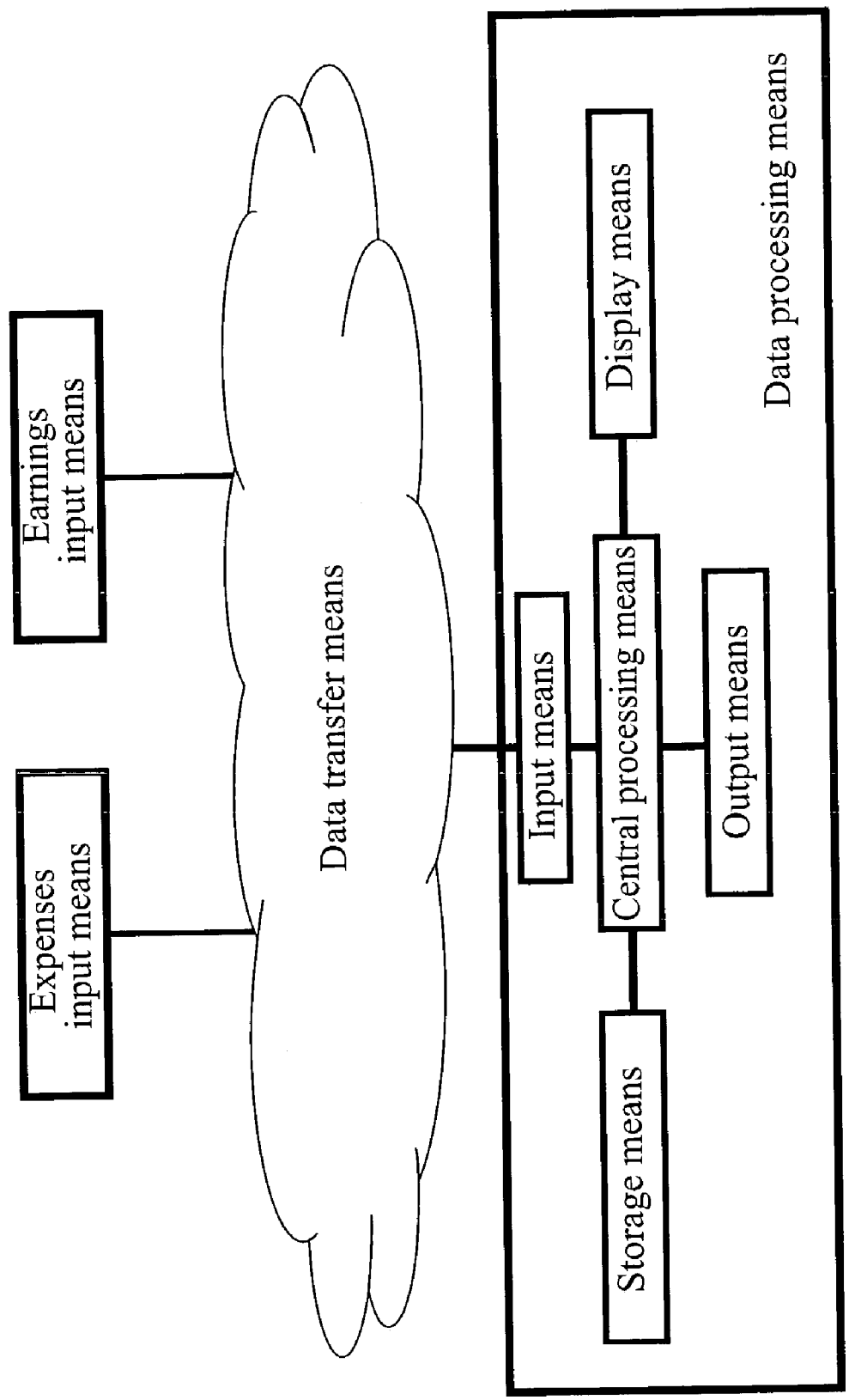
FIG. 18 is an explanatory view showing a data processing system for the education set of the embodiment.

FIG. 18 shows a data processing system for an education set employing such information communication devices. The system has input means for expenses and earnings and data processing means connected to the input means through data transfer means.

Figure 19:
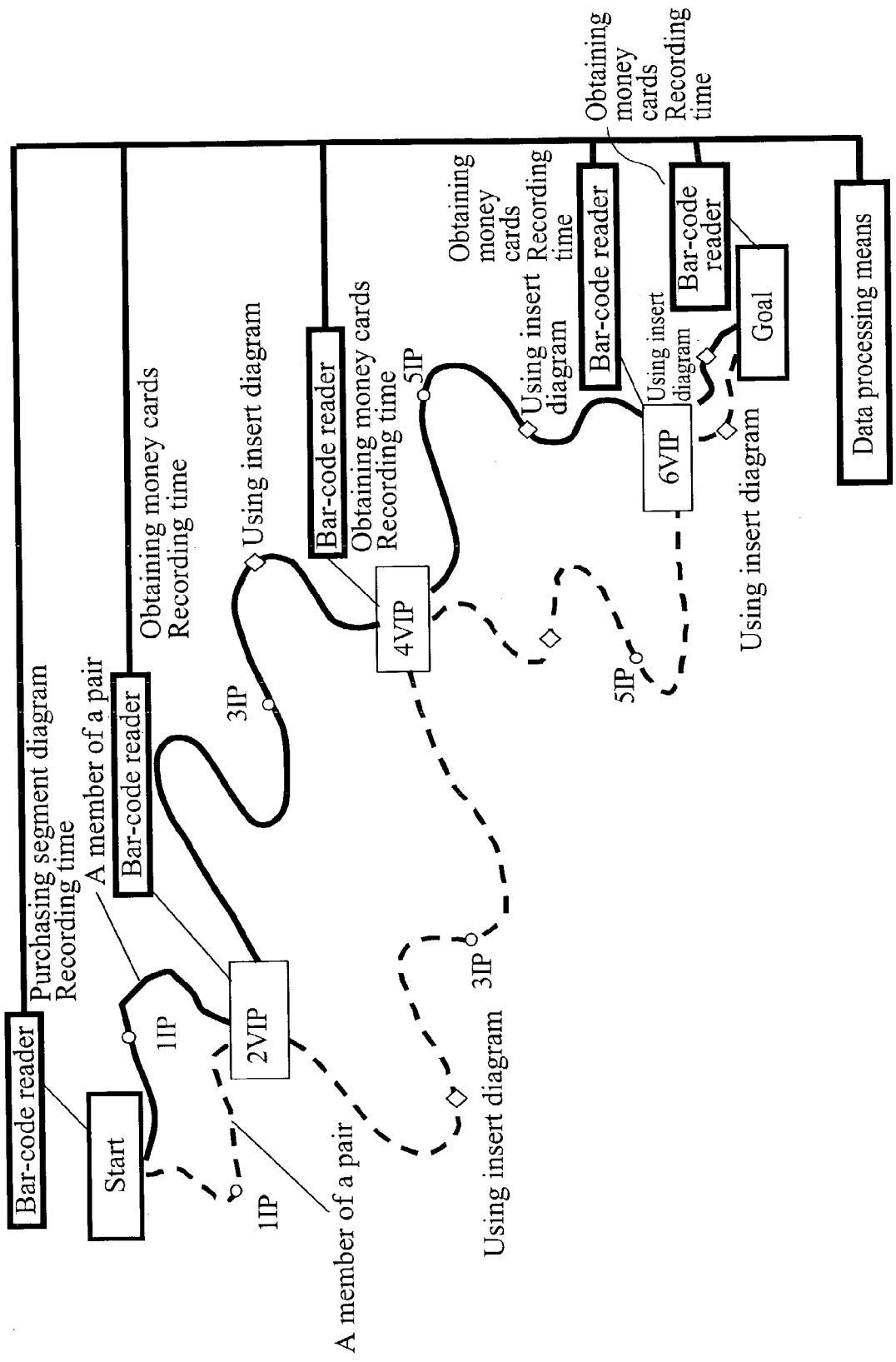
FIG. 19 is an explanatory view showing a data processing system employing a bar-code input system for the education set of the embodiment.

FIG. 19 shows a concrete example of the above-mentioned education set. Various types of data are expressed with bar codes, and the expenses/earnings input means are bar-code readers. In this example, a course consists of the start, 1IP, 2VIP, 3IP, 4VIP, 5IP, 6VIP, and the goal. Time costs are computed between the start and a VIP, between VIPs, and between a VIP and the goal.

Figure 20:
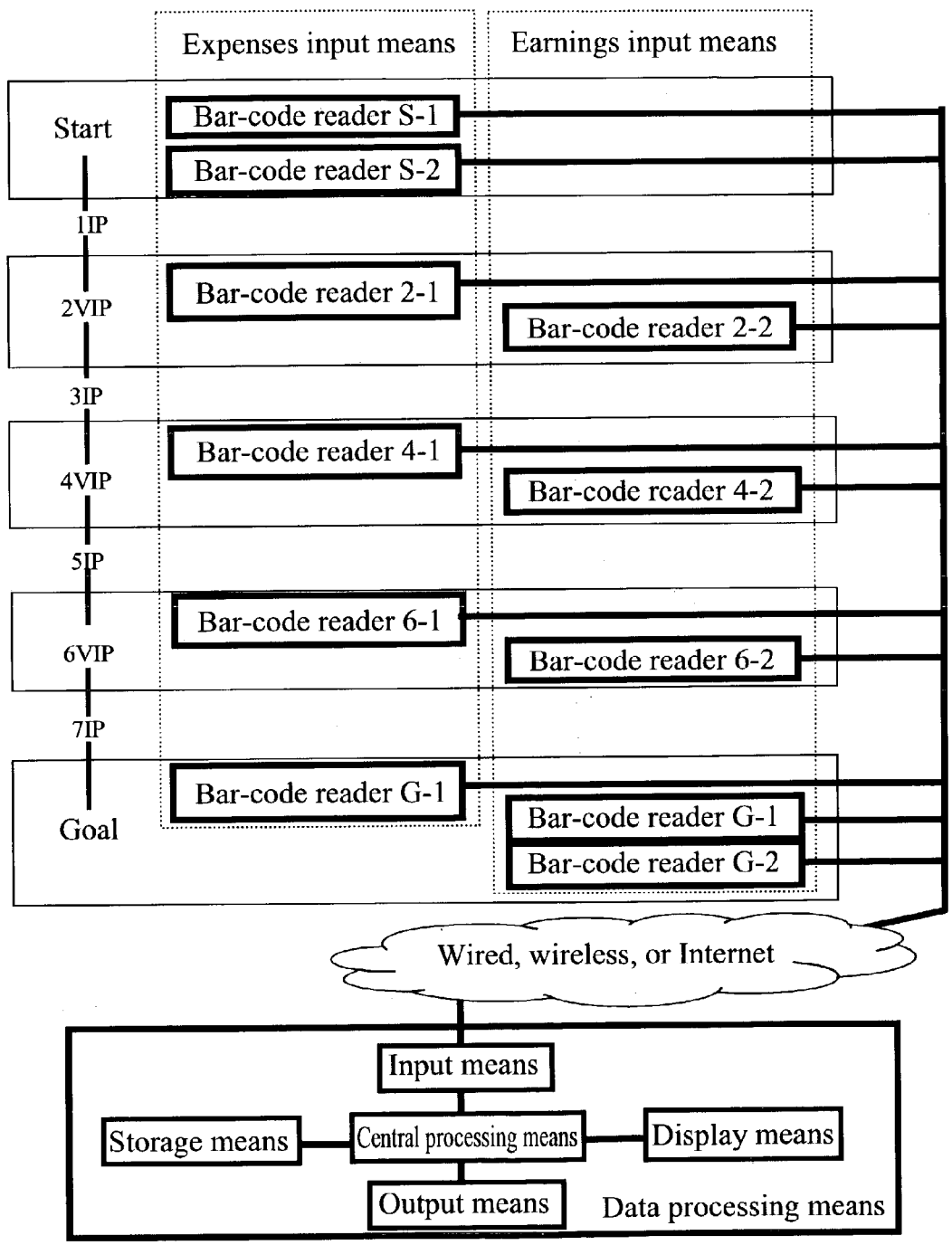
FIG. 20 is an explanatory view showing a data processing system employing a bar-code input system for the education set of the embodiment.

FIG. 20 shows a data processing system for such an arrangement.

In this case, bar-code readers S-1, 2-1, 4-1, 6-1, and G-1 are used to input start time, VIP arrival time, and goal arrival time, respectively. The bar-code reader S-2 is used to input a cost of a purchased segment diagram. The bar-code readers 2-2, 4-2, 6-2, and G-2 are used to input bar codes on insert diagrams to verify whether or not previous IPs before a given place have correctly been passed. The bar-code readers are also used to provide a pair of members with a money-card obtaining right if the pair has correctly passed IPs and reaches a VIP or the goal faster than a competitor pair. The bar-code reader G-1 is used to input an amount of the money cards carried by each participant to the goal. (If money cards are not carried to the goal because they are lost thereof in the middle of a course, they are invalidated.) Such data elements are passed through a wired network, a radio network, or the Internet and is entered into given data processing means (computer) to carry out a given data process and compute results. FIG. 20 shows a concrete example of an arrangement of bar-code readers.

The bar-code readers S-1 and S-2 may be the same bar-code reader in practice. The bar-code readers 2-1 and 2-2, 4-1 and 4-2, 6-1 and 6-2, and G-1 and G-2 may be the same bar-code readers, respectively.

FIGS. 21 to 23 and 24 to 26 show examples of segment diagrams 125*a, b,* and *c* and insert diagrams 126*a, a', a", b, b', b", c, c',* and *c"* used for the bar-code system.

The insert diagrams each have a corresponding course and a bar code 130 indicating an IP number.

Figure 27:
FIG. 27 is an explanatory view showing a money card with a bar code according to an embodiment of the education set of the present invention.

FIG. 27 shows an example of a money card used with the bar-code system.

The money card 115 has a bar code 130*b*, which is used to input, after the goal, an amount of money to be credited to the money card in connection with a participant that has obtained the money card.

FIG. 28 shows a money-card obtaining table 111 used with the bar-code system.

The money-card obtaining table is provided with bar codes 130c indicating pairs (partners pairs) having the right to obtain money-cards. As in the case of FIG. 9, a money-card-obtaining pair receives a mark (for example, a circle or a check mark) indicating the card acquisition. Reading a bar code 130c having the mark, data on a participant's number and a money-card-obtained VIP number is easily entered. (According to this embodiment, participants with Nos. 5, 6, and 60, 7, 8, and 70, 9, 10, and 90, and 11, 12, and 80 form 3-member groups, respectively.)

Figure 29:
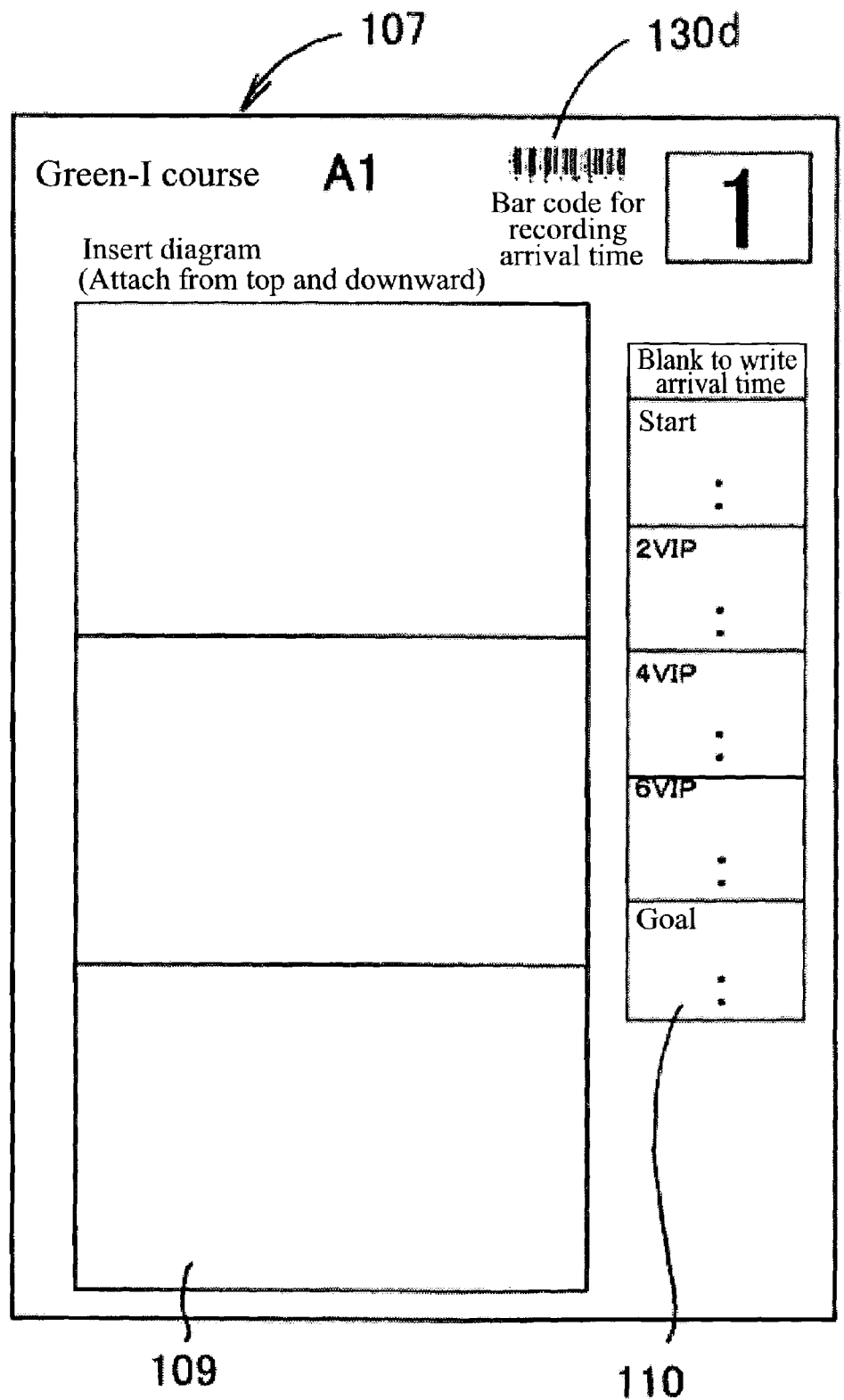
FIG. 29 is an explanatory view showing an IP pass sheet with a bar code according to an embodiment of the education set of the present invention.

FIG. 29 shows an IP pass sheet 107 used with the bar code system.

Provided on the IP pass sheet is a participant's number and a bar code 130d indicating a course (green-I in this example) for the participant to advance along. This bar code is read by a bar-code reader arranged at a VIP and time at the moment of arrival is used as VIP arrival time. The time is determined according to a clock in a computer provided for the bar-code reader. The IP pass sheet has columns 109 where insert diagrams (for example, 126a) are attached. A bar code on an insert diagram (FIGS. 24, 25, and 26) is collated with the bar code on the IP pass sheet, to determine whether or not the possessed insert diagram is correct (whether or not the partner has passed a correct IP). (Reference data to identify participants and insert diagrams possessed by the participants is stored in a memory of the computer provided for the bar-code reader.) According to this embodiment, the IP pass sheet has columns 110 to write VIP and goal arrival time. These columns are used to anticipate problems that may occur at VIPs and the goal when entering arrival time with the use of bar codes, and the columns are used to give priority to the arrival time written by the participant over the time entered with the bar codes.

FIG. 30 shows a segment-diagram purchase table 131 used with the bar code system.

The segment-diagram purchase table has bar codes (503) to record participant information (numbers) and bar codes (505) to record segment diagram information (prices for type-A to type-C, respectively) to be picked up by participants. Thereby, the price of a segment diagram purchased by each participant can be input easily.

Figure 31:
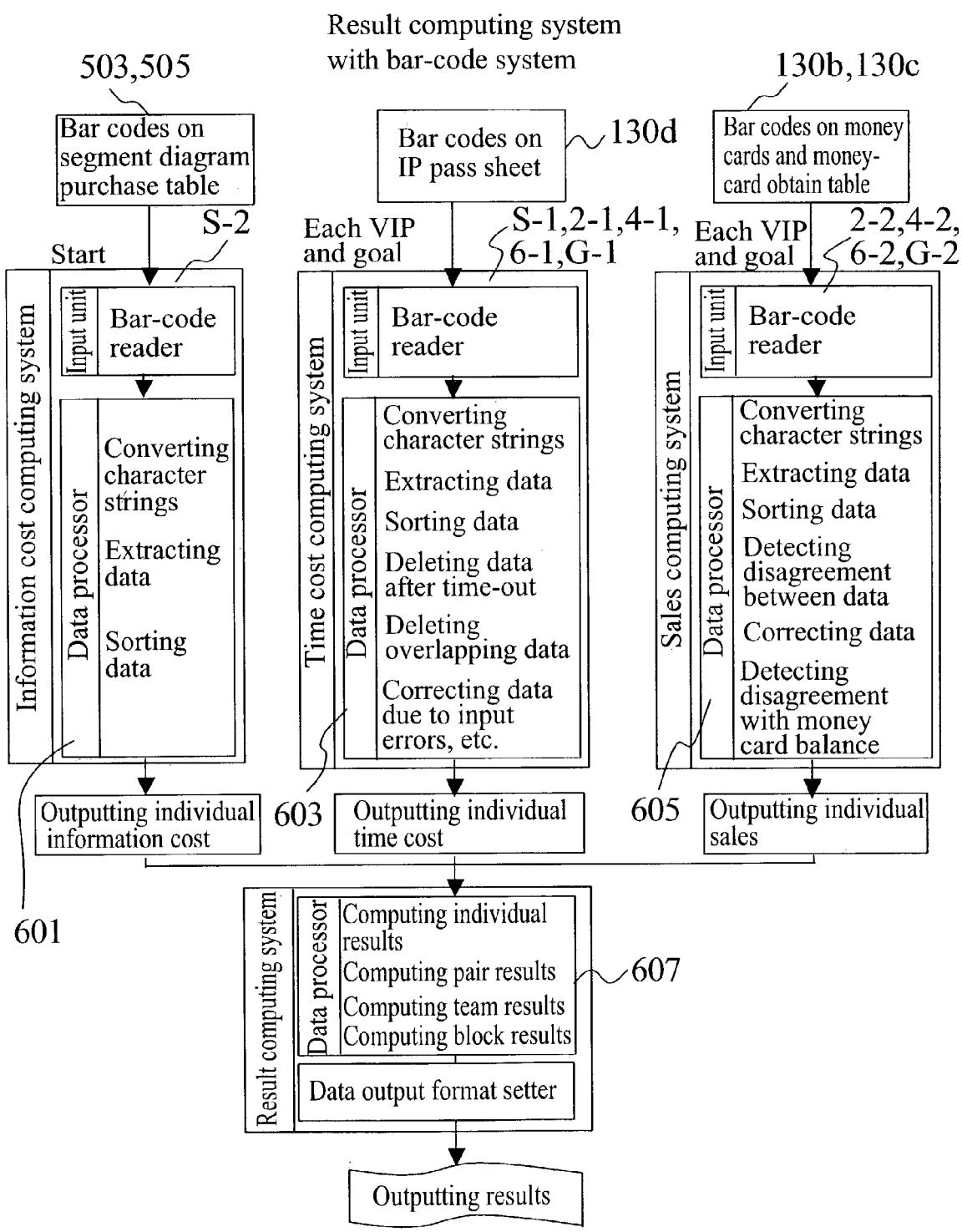
FIG. 31 is an explanatory view showing a result computing system employing bar codes according to an embodiment of the education set of the present invention.

FIG. 31 shows a result computing system used with the bar code system.

As shown in the figure, this system is an education system used with the education set, for training and educating about work which includes a series of work stages. The system includes a score computing means 605 for computing a score of a worker according to information from point cards 115 to be given to the worker when work is completed under given conditions, an information cost computing means 601 for computing an information cost related to the worker according to information from a segment-diagram purchase sheet 131 to record segment diagram information picked up by the worker, a time cost computing means 603 to compute a time cost according to work time of the worker, and a result computing means 607 for computing a result of the worker according to the score and cost of the worker.

The information cost computing means 601, time cost computing means 603, score computing means 605, and result computing means 607 are each realized with computer software executed by a computer.

The details thereof will be explained.

The bar codes 503 and 505 on the segment-diagram purchase table are read by the bar-code reader S-2, and the data processing unit 601 carries out character string conversion, data extraction, and data sort, to obtain data about the information cost of each participant (number). At the start, VIPs, and the goal, the bar code 130d on the IP pass sheet is read by the bar-code readers S-1, 2-1, 4-1, 6-1, and G-1, to enter time at each point. The data is subjected to character string conversion, data extraction, and data sorting by the data processor 603. Data after a time-out is deleted (entering a predetermined value), overlapping data is deleted (if a person repeatedly enters time, latest time is validated), mistakenly entered data is deleted, and data about an individual time cost is determined. The bar codes 130b and 130c on the money-card obtaining tables at the VIPs and goal and money cards carried to the goal are read by the bar-code readers 2-2, 4-2, 6-2, and G-2. The data processor 605 carries out character string conversion, data extraction, and data sorting on the read data, detects conformity of the data on the money-card obtaining tables and the data on the money cards actually carried to the goal, corrects the data if necessary, checks the balance of the money cards left at the VIPs and goal, corrects the data if necessary, and determines individual sales data. According to these pieces of data, the data processing apparatus of the result computing system calculates the results of individuals, pairs, teams, blocks, etc., and an output format setting unit sets an output format. Thus, the results are provided.

In this way, employing the bar-code system correctly and quickly computes results, to thereby further improve effects.

Tools such as the segment diagrams, IP pass sheets, insert diagrams, and money cards may be stored as information in IC cards, so that each member carries an IC card when advancing along a course. This may permit providing unattended VIPs and quick and appropriate information processing.

Figure 32:
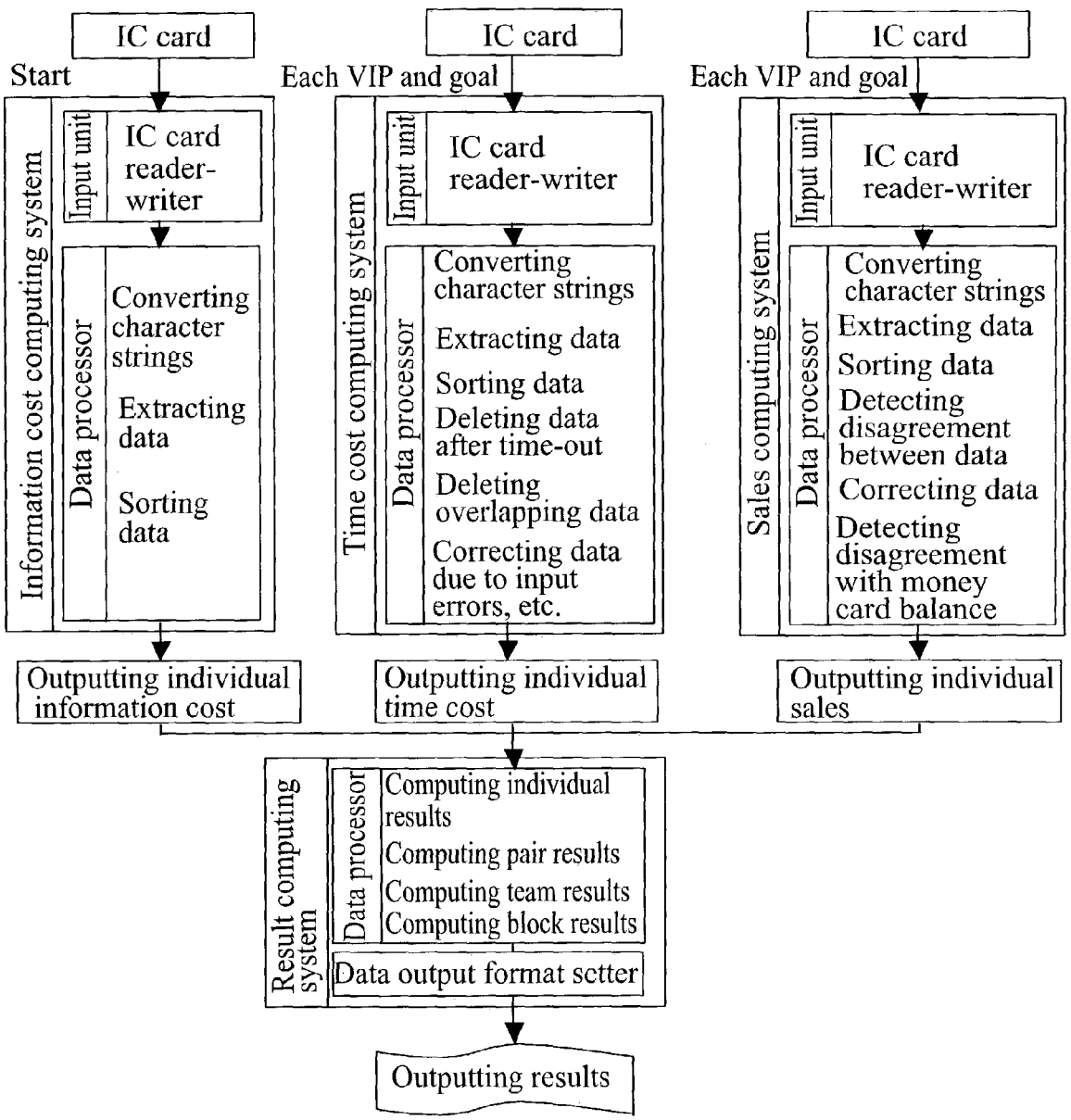
FIG. 32 is an explanatory view showing a result computing system employing IC cards according to an embodiment of the education set of the present invention.

FIG. 32 shows an example of such a result computing system.

In the above-mentioned example, a participant carries a segment diagram and an IP pass sheet and starts. If the participant obtains an insert diagram or money cards, the participant carries them with him or her. These tools may be entirely controlled with use a database, so that each participant may carry a portable information terminal holding the contents of a given segment diagram. At each IP or VIP, the participant transmits a given value displayed on a signboard to a host computer of the organizer, to inform the organizer of the arrival of the participant at the point and handle electronic data relating to an insert diagram or money cards. In addition, the time at this moment is recorded by the organizer.

Figure 33:
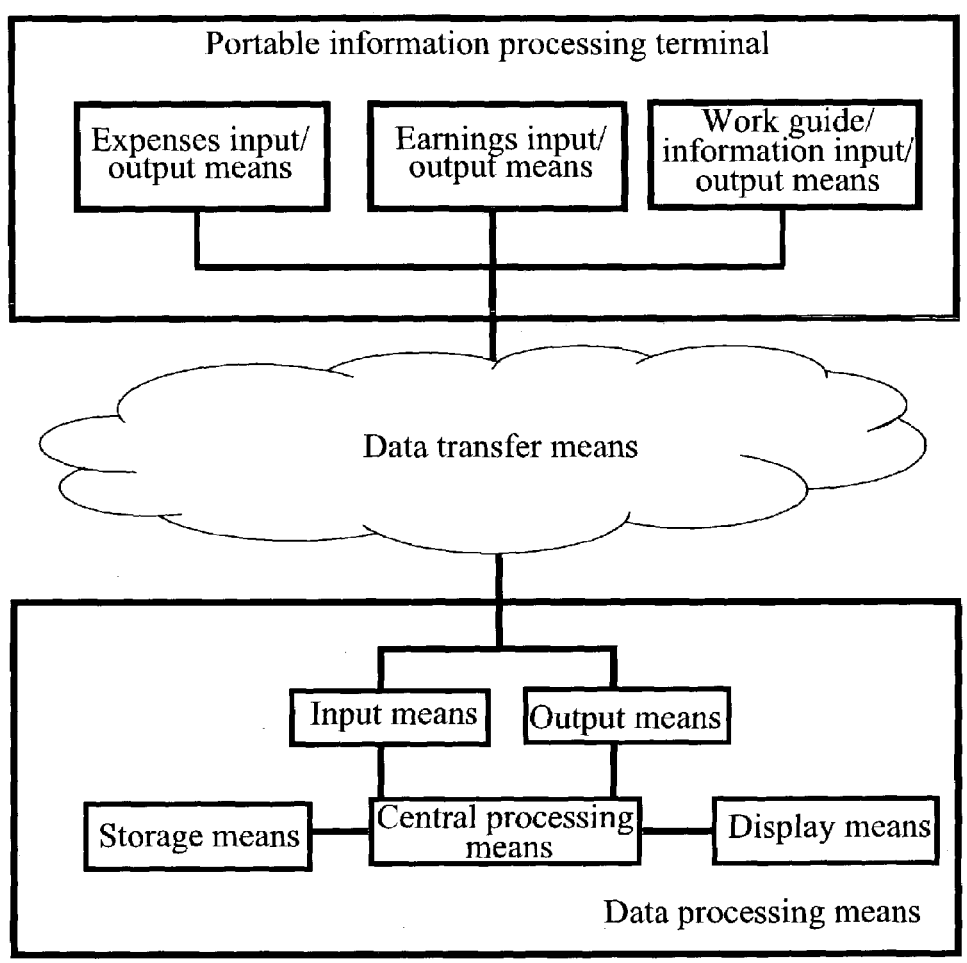
FIG. 33 is an explanatory view showing a configuration example of a system employing portable information processing terminals according to an embodiment of the education set of the present invention.

FIG. 33 shows a structural example of the above example.

A participant carries a portable information processing terminal and advances along a course. The terminal includes work guide/information input-output means for inputting and outputting segment and insert diagrams, expenses input-output means for inputting and outputting an amount of money paid for a purchased segment diagram and arrival time at VIPs and the goal, and earnings input-output means for inputting and outputting a money-card obtaining right and the amount of obtained money cards. The portable information processing terminal is connected to data processing means of the organizer through data transfer means mainly employing a wireless circuit.

This enables a participant to grasp their own progress, the progress of a partner, the progress of other participants of the same team (VIP arrival time, money-card obtaining rights, amounts of actually obtained money cards, obtained insert diagrams, positions of participants), or the progress of competitors. The participant can take action adapted to the situation and act dynamically and carefully. At the same time, a result is correctly and quickly computed in real time. These information data may be used by a team leader so that the team leader may send proper information such as instructions to the members if required, or receive information from a specific member and transfer the same to another member. In this way, measures to improve performance can be taken.

Another structure of a work model employing the education set of the embodiment may have a meeting point (MP) between the start and the goal, so that team members may meet.

Figure 34:
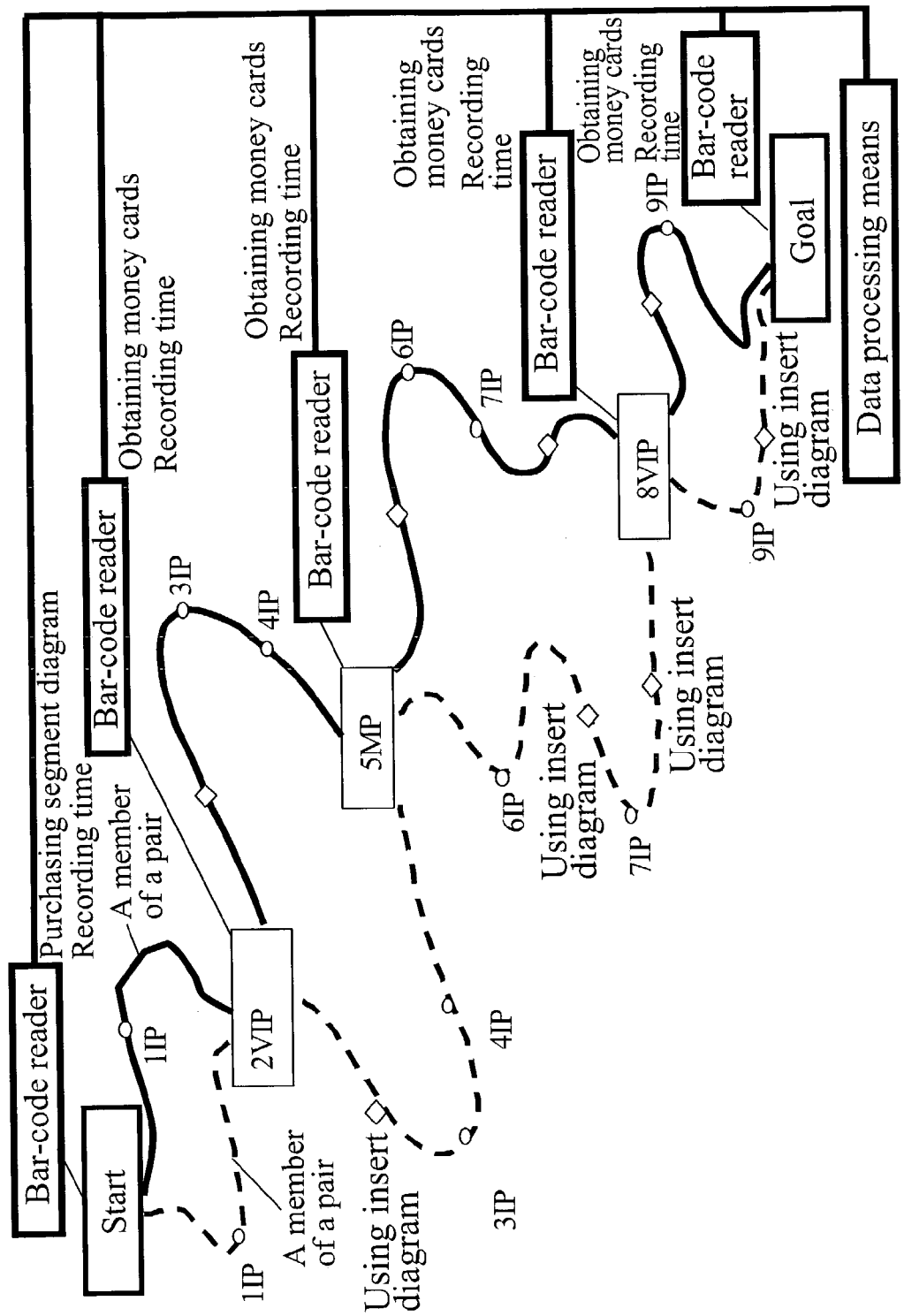
FIG. 34 is an explanatory view showing a data processing system employing meeting points and a bar-code input system according to an embodiment of the education set of the present invention.

FIG. 34 shows an exemplary structure of such a model.

In FIG. 34, a course includes the start, 1IP, 2VIP, 3IP, 4IP, 5MP, 6IP, 7IP, 8VIP, 9IP, and the goal. In this case, there are, for example, segment diagrams of four types A, B, C, and D. A team may consist of eight members divided into two groups (A-group and B-group) each consisting of four members. Each of the four members uses the A to D-type segment diagrams. Each group provides one member to form a pair team of two members. From the start, each member advances along the course through the points 1IP, 2VIP, 3IP, and 4IP to the point 5MP, while experiencing the function of the segment diagrams, collecting data, and understanding the work model system to some extent.

At the MP, the team members gather, and the A-group and B-group separately sort out knowledge concerning the work model system and clarify the system to some extent. The groups bring their conclusions together, evaluate the conclusions, carry out examinations and tests on the evaluation, and provide a team conclusion. According to the conclusion, the members establish countermeasures (action guides) to advance along the course, start from the MP, and advance through 6IP to the goal. In this way, this example clarifies a mechanism of an object (work) during the progress of work (while executing work) and accomplishes the work with the use of the clarified mechanism. This structure incorporates not only work to be carried out by individuals and work to be carried out by pairs but also work to be carried out by groups on a course and work to be carried out by teams, to symbolically express actual work. This structure is suitable especially for upper-level persons. This work expediting method of "from individuals to the whole" is disclosed in an information processing method (individual-whole system) separately invented by the present inventor.

In the above, meeting time at the MP may be determined in advance, and a delay of each member from the meeting time may be recorded as a time cost. Meeting duration may be recorded as a meeting cost of the team, to improve the effect. Experience of leading a meetings at the MP is effective to learn leadership techniques for work and train basic actions. This may provide great results in training leaders. This sort of work model is particularly effective as a training model to let individuals experience knowledge management as members or leaders. In this case, the above-mentioned information technology apparatuses may be fully utilized so that members and leaders may obtain individual progress information in real time. This may enhance the effect.

According to the embodiment mentioned above, each member of a pair singularly carries out work and a result thereof is used by the partner for the partner's work. According to another aspect of the education set of this embodiment and a work model employing the same, a predetermined member in a team prepares information, such as an instruction paper, a design drawing, and a way of performing work in connection with at least part of work to be carried out by another member of the same team. With the use of the information, the latter member accomplishes the work.

An embodiment according to this configuration will be explained. In this case, the complete course is prepared by an organizer (for example, a secretariat). Work to be carried out by a member largely consists of two stages, which are called a plan stage and an action stage.

In the plan stage, each participant receives an original course map (preferably an easy one to understand such as a map prepared by the Geographical Survey Institute) from the organizer and prepares a segment diagram to indicate a course to be followed separately from other members of the same team (without exchanging information).

Figure 35A:
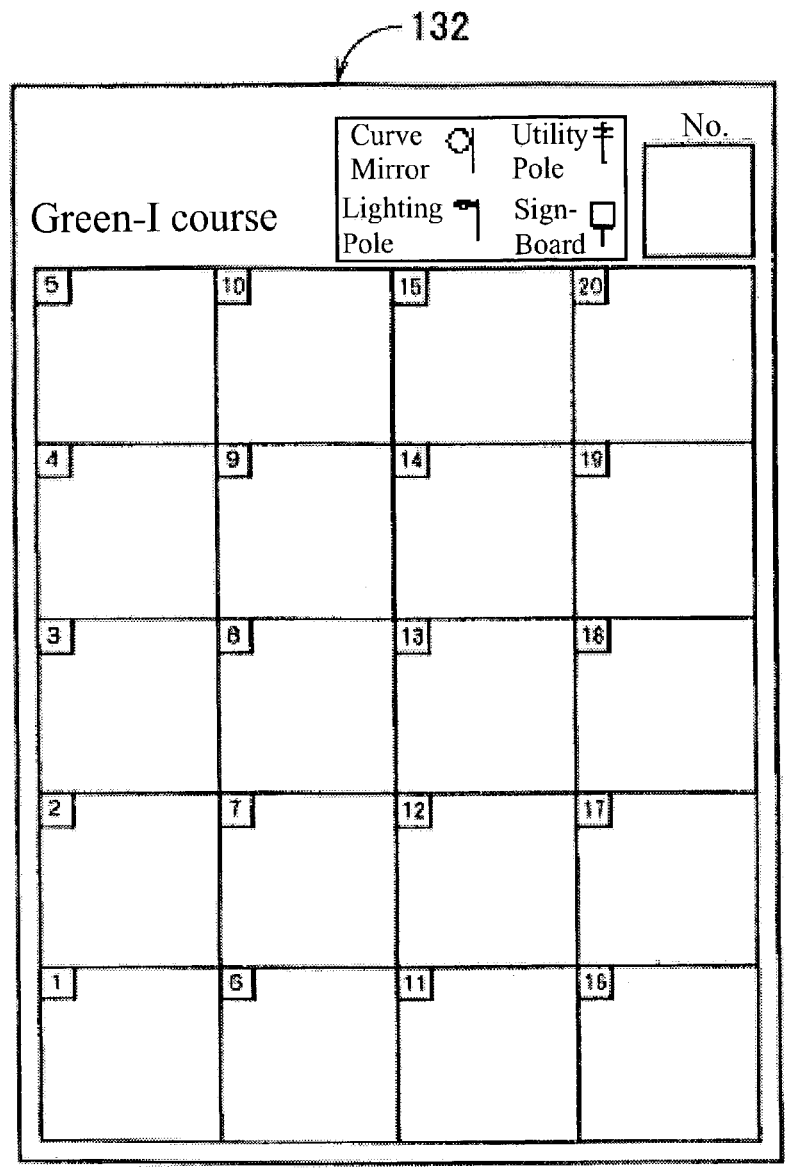
FIG. 35A and FIG. 35B are explanatory views showing a blank segment diagram according to an embodiment of the education set of the present invention.

FIG. 35A shows an example of a blank segment-diagram sheet used at this time.

Figure 35B:
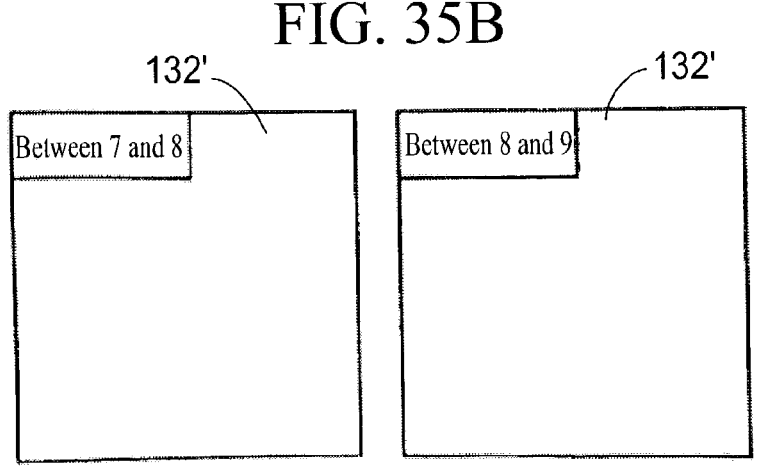

This is a segment diagram like the one shown in FIG. 2 but it is a blank. For example, seals (called segment-diagram-element seals) are prepared to relate segment-diagram elements like those shown in FIGS. 13 to 17 to intersections. The seals are attached to the blank segment-diagram sheet, or original characters or marks are written on the sheet, to provide a segment diagram. By using blank insert-diagram sheets shown in FIG. 35B, insert diagrams are also prepared or properly chosen. At this time, a cost is set for each of the segment-diagram elements and element seals. If original characters or marks are written, a cost is set for each of them. In this way, a cost is set depending on the content and quantity of information. With as little information as possible, segment and insert diagrams are prepared. All segment and insert diagrams for the entire course may not always be prepared by a participant. The organizer may partly prepare them and a participant may supplement them.

In the action stage, another member of the same team uses the segment and insert diagrams prepared by the first member mentioned above and advances along the course. At this time, like the embodiment mentioned above, the member competes with members of another team. For this purpose, VIPs are arranged in the middle of the course so that a member who first arrives at a VIP may obtain money cards. Expenses include the information cost concerning the prepared segment and insert diagrams and a time cost in the action stage.

According to the education set of this embodiment and a work model employing the same, team members are required to correctly share information to provide high results. The work model is quite suitable for training such matters. This embodiment models the grasping of the nature of participants and a course information mechanism and the combining of these elements in the best way, and therefore, is particularly effective to train the ability to integrate objects, i.e., the essence of the work.

Naturally, combining this aspect with the work model employing the meeting points is also effective.

According to the education set of this embodiment and work models employing the same, teams can compete with each other along an outdoor course. In this case, the course may be traced not only by foot but also by bus, train, cable car, ship, and the like.

The education set mentioned above and work models employing the same are applicable to training. An embodiment of this will be explained.

Eighty subjects consisting of males and females between 23 to 41 years old were randomly chosen and divided into two groups each including 40 subjects. One group received training employing a work model based on the embodiment, and the other group received training employing a walk rally as a comparative work model. The training on each group was carried out twice.

Figure 36:
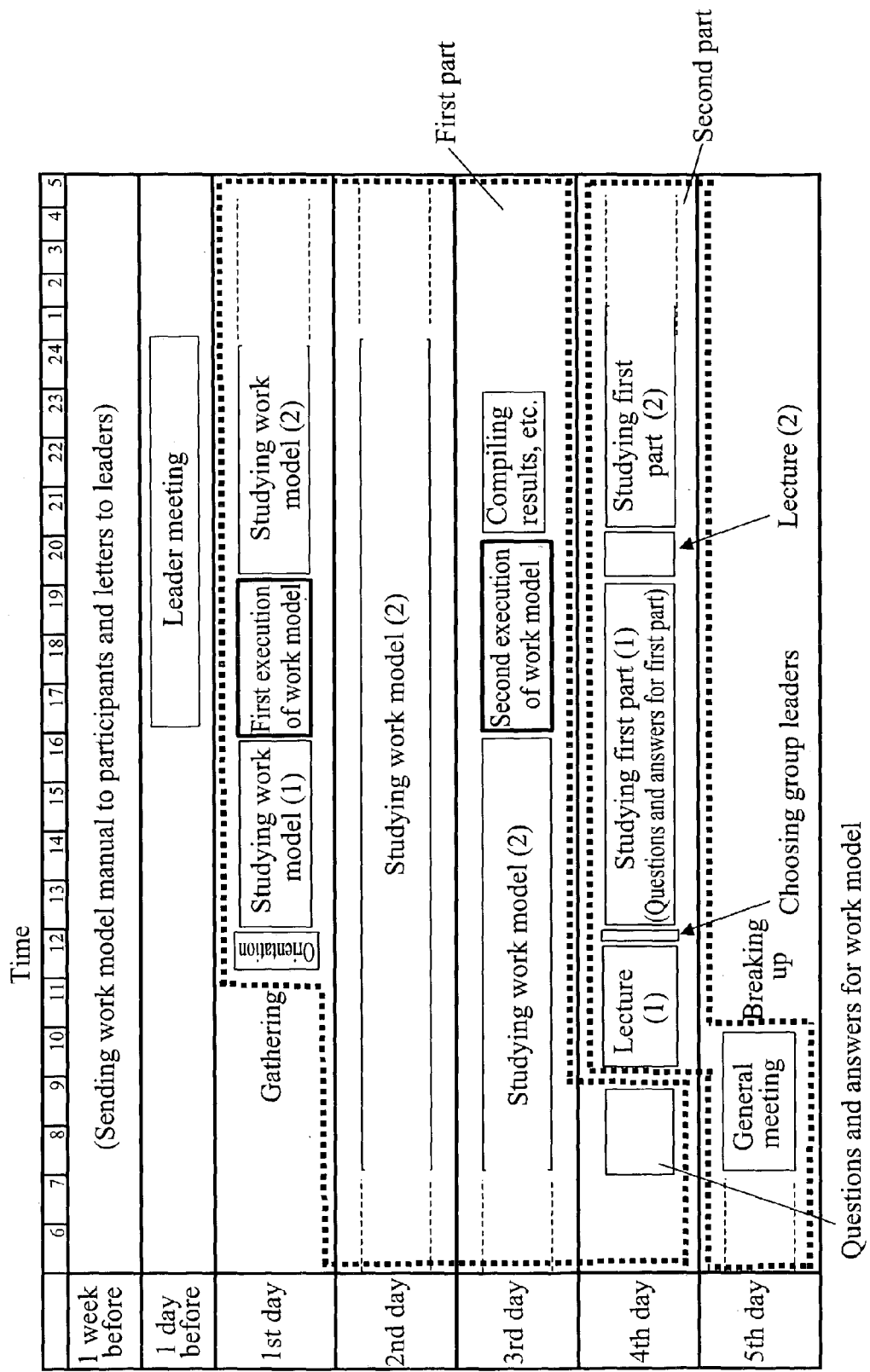
FIG. 36 is an explanatory view showing an embodiment of a training method employing the education set of the present invention.

FIG. 36 shows a general schedule of the training method.

Namely, preparations were made by sending a manual to each participant before training and by holding a leader meeting one day before the training. On the first day of the training, the first execution of the work model was carried out. Thereafter, based on that, the second execution of the work model was carried out on the third day of the training. On the fourth day, questions and answers concerning the work model were exchanged. The above is a first part of the training. In a second part thereof, the first part was studied. This training executes the work model without a lot of explanations, and thereafter, each member studies its own experience, to deepen understanding.

For each person received the training, the number P1 of statements, questions, and reports made by the person in meetings, gatherings, and interviews in an organization was measured for two weeks before the training. In addition, for two weeks after the training, the number P2 of the same items was measured. An increase $\Delta P(=P2-P1)$ was used as an indication of improvement by the training. From the data concerning the above three items of the subjects, group average values were calculated and summarized in Table 4. It is known that there is a clear correlation between the intellectual creativity, knowledge, and abilities of individuals and organizations and the numbers of statements, questions, and reports in meetings, gatherings, and interviews. Accordingly, it is appropriate to use $\Delta P$ as an indication of improvement by the training.

TABLE 4

|  | Embodiment | Comparative example |
|---|---|---|
| Average P1 before training | 4.1 | 4.3 |
| Average P2 after training | 13.3 | 6.5 |
| Increase | 9.2 | 2.2 |

From this result, it is understood that the embodiment can efficiently give an essential experience of work at low cost in a short period and greatly improve the intellectual creativity, knowledge, and abilities of individuals and organizations.

Although the embodiment was explained in connection with the schedule shown in FIG. 36, a schedule including one night and two days is naturally possible (for example, a work model manual is sent before, teams briefly study the work model in the morning of the first day, a first execution of the work model is carried out just after that, the work model is studied, a second execution of the work model is carried out in the afternoon of the second day, and the experience is examined). The first and second parts may be executed in separate schedules. The training method may be incorporated in a general training plan of, for example, a corporation and may be executed several times for different levels of a staff organization of the corporation or work experiences, to further increase the effect.

The last part (questions and answers for the work model) of the first part, or the second part of the above-mentioned embodiment may be executed with the use of a computer network.

Work models employing the education set of this embodiment are properly executable on about 30 to 300 persons, which are preferably divided into teams each of about 10 persons.

Performance in a work model employing the education set of the embodiment may be reflected on an entry fee of training, to provide an effect so that each participant seriously challenges the work model. For example, a basic entry fee is collected from a participant at first, and depending on performance in the work model, a predetermined amount of money is returned to the participant or additionally collected from the participant, or an amount of the additional charge is changed.

The education set of the embodiment mentioned above can be used as a format to expedite actual work, to improve the efficiency of actual business. An embodiment of a work efficiency improving method employing the education set of the embodiment will be explained. The following is an example to improve work efficiency of production personnel in a factory.

FIG. 37 generally shows the embodiment.

The factory includes a first production section, a second production section, and a management department. In FIG. 37, the first production section includes 12 persons including workers A-1, -2, and -3, workers B-1, -2, and -3, workers C-1, -2, and -3, and workers D-1, -2, and -3 and produces four types of products A, B, C, and D. For each product kind, three workers work in three shifts. The second production section consists of 12 persons and produces four types of product E, F, G, and I with three workers working in three shifts for each product type. The management department prepares work progress information corresponding to the segment diagrams 105*a, b,* and *c* and distributes the information to every worker of the first and second production sections. Actual work is carried out by four-person teams (a first team consisting of A-1, B-1, C-1, and D-1 and second and third teams comprising similarly).

Figure 38:
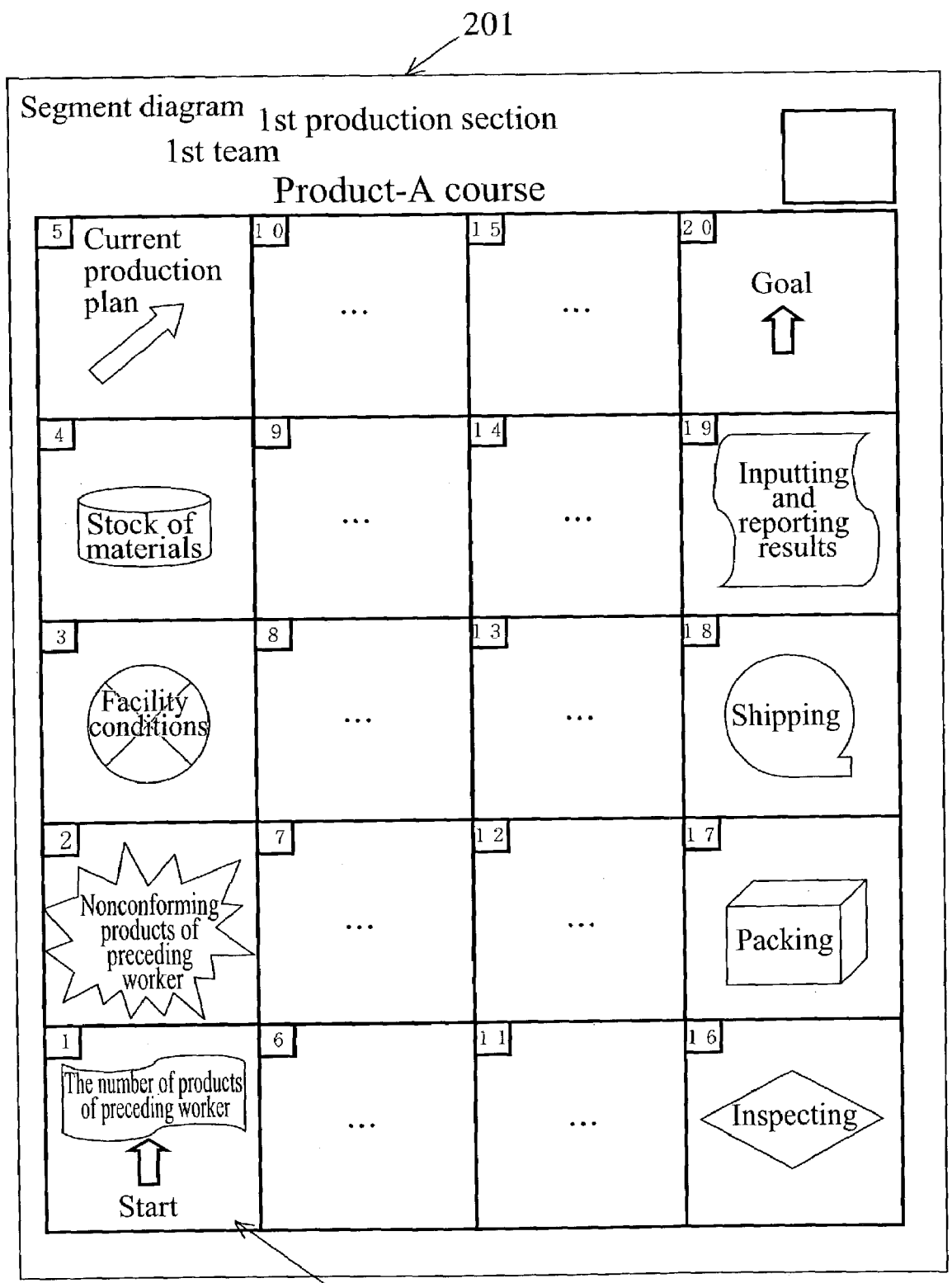
FIG. 38 is an explanatory view showing a segment diagram for the work efficiency improving method employing the education set of the embodiment.

FIG. 38 shows the details of the work progress information or segment diagram.

As shown in the figure, the segment diagram 201 shows (1) the start and collection of information about the number of products of the preceding worker, (2) obtaining information about nonconforming products in the products of the preceding worker, (3) collecting information concerning current manufacturing facility conditions, (4) obtaining information on raw materials in stock and an acceptance inspection state, (5) reviewing a first production plan, and the like. In this way, it shows a sequence of processes to obtain various kinds of information necessary for starting production. Then, it shows (6) the start of production (work) (not shown). Thereafter, it shows (16) inspection, (17) packing, and (18) shipment carried out under the control of the worker in charge. Then, it shows (19) entering and reporting a work result and (20) the goal.

Figure 39:
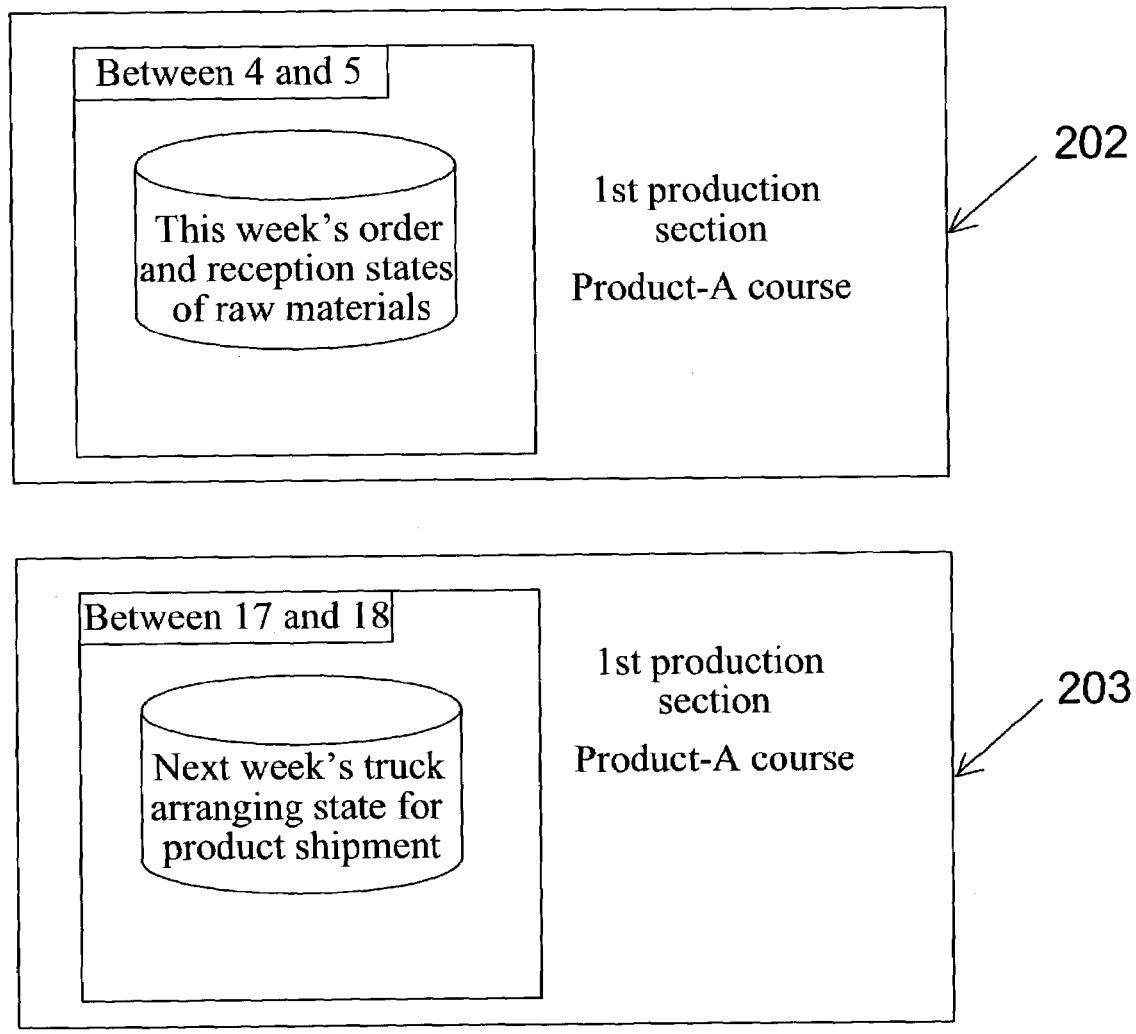
FIG. 39 is an explanatory view showing insert diagrams for the work efficiency improving method employing the education set of the embodiment.

Each worker obtains an insert diagram as information used by another worker in charge of the same product and hands it over to the second worker. For example, in FIG. 37, the worker A-1 obtains, in Monday work, an insert diagram 202 to be used by the worker A-3 and hands it over to the worker A-3. This insert diagram is, for example, an insert diagram 202 shown in FIG. 39 whose content is "This week's order and reception states of raw materials" (to be used between the segments (4) and (5)). In addition, an insert diagram 203 of "Next week's truck arranging state for product shipment" (to be used between the segments (17) and (18)) will be obtained. For example, the workers A-2 and A-3 obtain information for the workers A-1 and A-2, respectively, and hand the information over to the workers A-1 and A-2, respectively.

In this way, each worker obtains information to be used by another shift worker and uses information obtained by another worker, to proceed the work. In connection with a series of work performed in a week, the first and second production sections compete with each other for the production kinds, quantities, conforming products, delivery date correctness according to a contract with a customer. The section providing a better result receives a special pay.

The work model of the embodiment with the above-mentioned arrangement was used as a work promotion format, and based on it, a production activity was continued for 180 days. As a result, the average production capabilities of the first and second production sections per month increased 1.6 times and 1.3 times, respectively, than previously. A nonconforming-product ratio was reduced to about 1/5 of the previous ratio, and the number of product delivery errors to customers and delays was reduced to about 1/4. As a result, productivity greatly increased. This corresponds to an amount of money of 450 million yen and a profit improvement of 27%.

In this way, using the education set of the embodiment as a work promotion format greatly improves productivity.

The segment diagrams, insert diagrams, and courses to follow of the education set of the embodiment may be prepared on a computer, so that a participant advances along a course on a computer, obtains predetermined insert diagrams, hands them over to other members of the same team on computers, exchanges information, and competes with a competitor team to reach the goal. This method naturally provides the same effect. In this case, the second part of the above-mentioned training method may be a lecture or meeting, or naturally, the participants may meet on the Internet without actually meeting at a location.

As explained above, the education set of the embodiment includes segment diagrams (105a, b, c) showing work guides or work information partly excluding work guides or work information needed to carry out a series of work stages and insert diagrams (106a, b, c) showing the information excluded from the segment diagrams.

A work model employing the education set has a mechanism that at least part of a result of work accomplished by a given member in a team is used by another member of the same team to accomplish work. A result thereof is an achievement. In this way, the work model provides an essential experience of work.

A work model employing the education set of the embodiment is naturally executable by members of, for example, a corporation. In addition, it is executable by members of associations, local governments, and various public associations, or by members and students of various education institutions and schools, to provide great effect.

Unlike the conventional training methods including business games, orienteering, and walk rally, the education set allows individuals to understand work essence through experience and provides a multiplier effect of improving the individual and organizational abilities. The education set can give participants quite meaningful experiences.

According to the work model that provides a participant with insufficient information, the participant must analyze the meaning of the information, obtain supplemental information, and carry out a special walking task. This imposes intricate problems on the participant, so that the participant may acquire an excellent work experience of a higher intellectual level. The education set is applicable to training methods, employment examinations, promotion tests, and work evaluations.

The invention claimed is:

1. An education set used for a training activity, in which participants advance along a predetermined walking course to reach a goal, said walking course including at least N intersections, N being a positive integer greater than or equal to two, said education set comprising:
   a segment diagram sheet including (N-n) first segment diagram elements, each first segment diagram element showing a corresponding intersection of (N-n) intersections of said N intersections, n being a positive integer greater than or equal to one but smaller than N; and
   n insert diagram cards each including a second segment diagram element which shows a corresponding intersection of n intersections of said N intersections other than said (N-n) intersections,
   wherein each of said first and second segment diagram elements includes a figure for identifying the corresponding intersection shown therein and a figure showing an exit road from said intersection, respectively,
   wherein said first segment diagram elements are assigned a serial number,
   wherein each of said second segment diagram elements includes position information of the respective intersection shown therein, said position information including the serial number of one of the first segment diagram elements which shows a previous intersection or a next intersection of said respective intersection, and
   wherein the n insert diagram cards include a bar code storing information on said walking course.

2. An education set used for a training activity, in which participants advance along a predetermined walking course to reach a goal, said walking course including at least N intersections, N being a positive integer greater than or equal to two, said education set comprising:
   a segment diagram sheet including (N-n) first segment diagram elements, each first segment diagram element showing a corresponding intersection of (N-n) intersections of said N intersections, n being a positive integer greater than or equal to one but smaller than N;
   n insert diagram cards each including a second segment diagram element which shows a corresponding intersection of n intersections of said N intersections other than said (N-n) intersections; and
   a recording sheet including a space in which to attach an insert diagram card, a space to record participant information, and a space to record a goal arrival time,
   wherein each of said first and second segment diagram elements includes a figure for identifying the corresponding intersection shown therein and a figure showing an exit road from said intersection, respectively,
   wherein said first segment diagram elements are assigned a serial number, and
   wherein each of said second segment diagram elements includes position information of the respective intersection shown therein, said position information including the serial number of one of the first segment diagram elements which shows a previous intersection or a next intersection of said respective intersection.

3. An education set used for a training activity, in which participants advance along a predetermined walking course to reach a goal, said walking course including at least N intersections, N being a positive integer greater than or equal to two, said education set comprising:
   a segment diagram sheet including (N-n) first segment diagram elements, each first segment diagram element showing a corresponding intersection of (N-n) intersections of said N intersections, n being a positive integer greater than or equal to one but smaller than N;

n insert diagram cards each including a second segment diagram element which shows a corresponding intersection of n intersections of said N intersections other than said (N-n) intersections; and a recording sheet including a space in which to attach an insert diagram card and a space to record a goal arrival time, said recording sheet being provided with a bar code to store participant information, wherein each of said first and second segment diagram elements includes a figure for identifying the corresponding intersection shown therein and a figure showing an exit road from said intersection, respectively, wherein said first segment diagram elements are assigned a serial number, and wherein each of said second segment diagram elements includes position information of the respective intersection shown therein, said position information including the serial number of one of the first segment diagram elements which shows a previous intersection or a next intersection of said respective intersection.

4. An education set used for a training activity, in which participants advance along a predetermined walking course to reach a goal, said walking course including at least N intersections, N being a positive integer greater than or equal to two, said education set comprising:

a segment diagram sheet including (N-n) first segment diagram elements, each first segment diagram element showing a corresponding intersection of (N-n) intersections of said N intersections, n being a positive integer greater than or equal to one but smaller than N;

n insert diagram cards each including a second segment diagram element which shows a corresponding intersection of n intersections of said N intersections other than said (N-n) intersections; and a point card to be given to a participant when the participant arrives at the goal under given conditions, said point card including a bar code to store point information, wherein each of said first and second segment diagram elements includes a figure for identifying the corresponding intersection shown therein and a figure showing an exit road from said intersection, respectively, wherein said first segment diagram elements are assigned a serial number, and wherein each of said second segment diagram elements includes position information of the respective intersection shown therein, said position information including the serial number of one of the first segment diagram elements which shows a previous intersection or a next intersection of said respective intersection.

5. An education set used for a training activity, in which participants advance along a predetermined walking course to reach a goal, said walking course including at least one checkpoint and at least N intersections, N being a positive integer greater than or equal to two, said education set comprising:

a segment diagram sheet including (N-n) first segment diagram elements, each first segment diagram element showing a corresponding intersection of (N-n) intersections of said N intersections, n being a positive integer greater than or equal to one but smaller than N;

n insert diagram cards each including a second segment diagram element which shows a corresponding intersection of n intersections of said N intersections other than said (N-n) intersections; and a sheet configured to show a standard checkpoint arrival time or a standard goal arrival time, said standard checkpoint arrival time or standard goal arrival time being set for each participant, wherein each of said first and second segment diagram elements includes a figure for identifying the corresponding intersection shown therein and a figure showing an exit road from said intersection, respectively, wherein said first segment diagram elements are assigned a serial number, and wherein each of said second segment diagram elements includes position information of the respective intersection shown therein, said position information including the serial number of one of the first segment diagram elements which shows a previous intersection or a next intersection of said respective intersection.

6. An education set used for a training activity, in which participants advance along a predetermined walking course to reach a goal, said walking course including at least N intersections, N being a positive integer greater than or equal to two, said education set comprising:

a plurality types of segment diagram sheets including (N-n) first segment diagram elements, each first segment diagram element showing a corresponding intersection of (N-n) intersections of said N intersections, said plurality of types of segment diagram sheets being prepared for said walking course, n being a positive integer greater than or equal to one but smaller than N;

a plurality types of sets of n insert diagram cards each including a second segment diagram element which shows a corresponding intersection of n intersections of said N intersections other than said (N-n) intersection, said plurality of types of sets of insert diagram cards being prepared for said walking course; and a segment-diagram purchase sheet including a bar code to store information on the type of segment diagram sheets to be picked up by the participants, wherein each of said first and second segment diagram elements includes a figure for identifying the corresponding intersection shown therein and a figure showing an exit road from said intersection, respectively, wherein said first segment diagram elements are assigned a serial number, and wherein each of said second segment diagram elements includes position information of the respective intersection shown therein, said position information including the serial number of one of the first segment diagram elements which shows a previous intersection or a next intersection of said respective intersection.

7. An education system used with an education set to conduct education about work which includes a plurality of work stages to be carried out in a sequential order, the education set comprising a segment diagram showing work information partly excluding work information needed to carry out the plurality of work stages; and an insert diagram showing the work information excluded from the segment diagram, the education system comprising:

a score computing device configured to compute a score of a worker according to information from a point card to be given to the worker when the worker completes work under given conditions;

a cost computing device configured to compute a cost related to the worker according to a work time of the worker and information from a segment-diagram purchase sheet to record information about a segment diagram picked up by the worker;

a result computing device configured to compute a result of the worker according to the score and cost of the worker;

a first information reading device configured to read point information from a first information recording device provided on the point card;

a second information reading device configured to read segment-diagram-cost information from a second information recording device provided on the segment-diagram purchase sheet; and a third information reading device configured to read worker information from a third information recording device provided on a work progress recording sheet at the start and completion of work, to compute work time of a worker.

8. The system of claim 7, wherein, the third information reading device is provided at each work execution location, for reading information from the third information recording device to record worker information and a fourth information recording device to record insert-diagram information on the work progress recording sheet.

9. An education set used for a training activity, in which participants advance along a predetermined walking course to reach a goal, said walking course including at least N intersections, N being a positive integer greater than or equal to two, said education set comprising:

a segment diagram sheet including (N-n) first segment diagram elements, each first segment diagram element showing a corresponding intersection of (N-n) intersections of said N intersections, n being a positive integer greater than or equal to one but smaller than N; and n insert diagram cards each including a second segment diagram element which shows a corresponding intersection of n intersections of said N intersections other than said (N-n) intersections, respectively, wherein each of said first and second segment diagram elements includes a figure for identifying the corresponding intersection shown therein and a figure showing an exit road from said intersection, respectively, wherein said first segment diagram elements are assigned a serial number, wherein each of said second segment diagram elements includes position information of the respective intersection shown therein, said position information including the serial number of one of the first segment diagram elements which shows a previous intersection or a next intersection of said respective intersection, and wherein the n insert diagram cards have a computer readable medium storing information of said walking course.

10. An education set used for a training activity, in which participants advance along a predetermined walking course to reach a goal, said walking course including at least N intersections, N being a positive integer greater than or equal to two, said education set comprising:

a segment diagram sheet including (N-n) first segment diagram elements, each first segment diagram element showing a corresponding intersection of (N-n) intersections of said N intersections, n being a positive integer greater than or equal to one but smaller than N;

n insert diagram cards each including a second segment diagram element which shows a corresponding intersection of n intersections of said N intersections other than said (N-n) intersections; and a recording sheet including a space in which to attach an insert diagram card and a space to record a goal arrival time, said recording sheet being provided with a computer readable medium to store participant information, wherein each of said first and second segment diagram elements includes a figure for identifying the corresponding intersection shown therein and a figure showing an exit road from said intersection, respectively, wherein said first segment diagram elements are assigned a serial number, and wherein each of said second segment diagram elements includes position information of the respective intersection shown therein, said position information including the serial number of one of the first segment diagram elements which shows a previous intersection or a next intersection of said respective intersection.

11. An education set used for a training activity, in which participants advance along a predetermined walking course to reach a goal, said walking course including at least N intersections, N being a positive integer greater than or equal to two, said education set comprising:

a segment diagram sheet including (N-n) first segment diagram elements, each first segment diagram element showing a corresponding intersection of (N-n) intersections of said N intersections, n being a positive integer greater than or equal to one but smaller than N;

n insert diagram cards each including a second segment diagram element which shows a corresponding intersection of n intersections of said N intersections other than said (N-n) intersections; and a point card to be given to a participant when the participant arrives at the goal under given conditions, said point card including a computer readable medium to store point information, wherein each of said first and second segment diagram elements includes a figure for identifying the corresponding intersection shown therein and a figure showing an exit road from said intersection, respectively, wherein said first segment diagram elements are assigned a serial number, and wherein each of said second segment diagram elements includes position information of the respective intersection shown therein, said position information including the serial number of one of the first segment diagram elements which shows a previous intersection or a next intersection of said respective intersection.

12. An education set used for a training activity, in which participants advance along a predetermined walking course to reach a goal, said walking course including at least N intersections, N being a positive integer greater than or equal to two, said education set comprising:

a plurality of types of segment diagram sheets including (N-n) first segment diagram elements, each first segment diagram element showing a corresponding intersection of (N-n) intersections of said N intersections, said plurality of types of segment diagram sheets being prepared for said walking course, n being a positive integer greater than or equal to one but smaller than N;

a plurality types of sets of n insert diagram cards each including a second segment diagram element which shows a corresponding intersection of n intersections of said N intersections other than said (N-n) intersection, said plurality of types of sets of insert diagram cards being prepared for said walking course; and a segment-diagram purchase sheet including a computer readable medium to store information on the types of segment diagram sheets to be picked up by the participants, wherein each of said first and second segment diagram elements includes a figure for identifying the corresponding intersection shown therein and a figure showing an exit road from said intersection, respectively, wherein said first segment diagram elements are assigned a serial number, and wherein each of said second segment diagram elements includes position information of the respective intersection shown therein, said position information including the serial number of one of the first segment diagram elements which shows a previous intersection or a next intersection of said respective intersection.

13. An education system used with an education set for a training activity, in which participants advance along a predetermined walking source to reach a goal, said walking course including at least N intersections, N being a positive integer greater than or equal to two, said education set comprising: a segment diagram sheet including (N-n) first segment diagram elements, each first segment diagram element showing a corresponding intersection of (N-n) intersections of said N intersections, n being a positive integer greater than or equal to one but smaller than N; and n insert diagram cards each including a second segment diagram element which shows a corresponding intersection of n intersections of said N intersections other than said (N-n) intersection, wherein each of said first and second segment diagram elements includes a figure for identifying the intersection shown therein and a figure showing an exit road from said intersection, respectively, wherein said first segment diagram elements are assigned a serial number, and wherein each of said second segment diagram elements includes position information of the respective intersection shown therein, said position information including the serial number of one of the first segment diagram elements which shows a previous intersection or a next intersection of said respective intersection, the education system comprising:

a score computing device configured to compute a score of a participant according to information from a point card to be given to the participant when the participant arrives at the goal under given conditions;

a cost computing device configured to compute a cost related to the participant according to the goal arrival time of the participant and information from a segment-diagram purchase sheet to record information about a segment diagram sheet picked up by the participant; and a result computing device configured to compute a result of the participant according to the score and cost of the participant.

14. The system of claim 13, wherein the cost computing device includes:

an information cost computing device configured to compute an information cost of a participant according to information from a segment-diagram purchase sheet to record information about a segment diagram sheet picked up by the participant; and a time cost computing device configured to compute a time cost of the participant according to the goal arrival time of the participant.

* * * * *